US012572344B2

(12) United States Patent
Chen et al.

(10) Patent No.: US 12,572,344 B2
(45) Date of Patent: Mar. 10, 2026

(54) CLOUD-PHONE-BASED APPLICATION INSTALLATION METHOD, CLOUD PLATFORM, AND RELATED DEVICE

(71) Applicant: Huawei Cloud Computing Technologies Co., Ltd., Guizhou (CN)

(72) Inventors: Jiadun Chen, Shenzhen (CN); Liang Ming, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 279 days.

(21) Appl. No.: 18/167,587

(22) Filed: Feb. 10, 2023

(65) Prior Publication Data

US 2023/0185556 A1      Jun. 15, 2023

Related U.S. Application Data

(63) Continuation of application No. PCT/CN2021/092955, filed on May 11, 2021.

(30) Foreign Application Priority Data

Aug. 11, 2020   (CN) .......................... 202010802212.7
Dec. 3, 2020    (CN) .......................... 202011395057.8

(51) Int. Cl.
G06F 9/44          (2018.01)
G06F 8/61          (2018.01)
(Continued)

(52) U.S. Cl.
CPC .............. G06F 8/61 (2013.01); G06F 9/3004 (2013.01); G06F 8/65 (2013.01)

(58) Field of Classification Search
CPC ............. G06F 8/61; G06F 8/65; G06F 9/3004
See application file for complete search history.

(56) References Cited

U.S. PATENT DOCUMENTS 11,044,591 B2 *   6/2021   Yazdani .................. H04W 4/50
11,258,797 B2 *   2/2022   Wilson .................... G06F 21/41
(Continued)

FOREIGN PATENT DOCUMENTS

CN          109391688 A      2/2019
CN          109683919 A      4/2019
(Continued)

OTHER PUBLICATIONS

Nafize Rabbani Paiker, Design and Implementation of an Overlay File System for Cloud-Assisted Mobile Apps, 2017, pp. 1-15. https://ieeexplore.ieee.org/stamp/stamp.jsp?tp=&arnumber=8068281 (Year: 2017).*

(Continued)

*Primary Examiner* — Mongbao Nguyen
(74) *Attorney, Agent, or Firm* — Conley Rose, P.C.

(57) ABSTRACT

A cloud platform provides a cloud phone configuration interface for a user to configure a template cloud phone based on a first input of the user. The cloud platform then provides a network shared file configuration interface for the user to store a directory of the template cloud phone into a first network shared file based on a second input of the user, and then configure, based on a third input of the user, at least one to-be-configured cloud phone to mount the first network shared file, to complete installation of a plurality of applications. Therefore, the cloud phone installs, updates, and uninstalls the applications by mounting the network shared file.

20 Claims, 13 Drawing Sheets

(51) Int. Cl.

| | |
|---|---|
| *G06F 9/30* | (2018.01) |
| *G06F 9/445* | (2018.01) |
| *G06F 9/45* | (2006.01) |
| *G06F 9/455* | (2018.01) |
| *G06F 8/65* | (2018.01) |

(56) References Cited

U.S. PATENT DOCUMENTS

| | | | | |
|---|---|---|---|---|
| 2014/0006357 | A1* | 1/2014 | Davis | G06F 16/182 |
| | | | | 707/667 |
| 2016/0321287 | A1* | 11/2016 | Luthra | H04L 67/34 |
| 2018/0206060 | A1 | 7/2018 | Yazdani et al. | |
| 2018/0349150 | A1* | 12/2018 | Wong | G06F 9/4493 |
| 2019/0102162 | A1* | 4/2019 | Pitre | H04L 63/10 |
| 2020/0082094 | A1* | 3/2020 | Mcallister | G06F 8/77 |
| 2020/0117434 | A1* | 4/2020 | Biskup | G06F 9/445 |
| 2020/0226101 | A1* | 7/2020 | Dhanabalan | G06F 9/45558 |

FOREIGN PATENT DOCUMENTS

| | | | | | |
|---|---|---|---|---|---|
| CN | 109922106 | A | * | 6/2019 | |
| CN | 110417785 | A | | 11/2019 | |
| CN | 110806911 | A | | 2/2020 | |
| CN | 111258596 | A | * | 6/2020 | G06F 8/61 |
| CN | 111432019 | A | * | 7/2020 | H04L 67/1095 |

OTHER PUBLICATIONS

Meng et al. (CN 109922106 A), 2019, pp. 1-12. (Year: 2019).*

English translation, Deng (CN 111258596 A), 2020, pp. 1-15. (Year: 2020).*

Olli-Pekka Heinisuo, Asterism: Decentralized File Sharing Application for Mobile Devices, 2019, pp. 38-46. https://ieeexplore.ieee.org/stamp/stamp.jsp?tp=&arnumber=8710656 (Year: 2019).*

* cited by examiner

140

Application server

Network 120

TO

110

Terminal device

CONT.
FROM

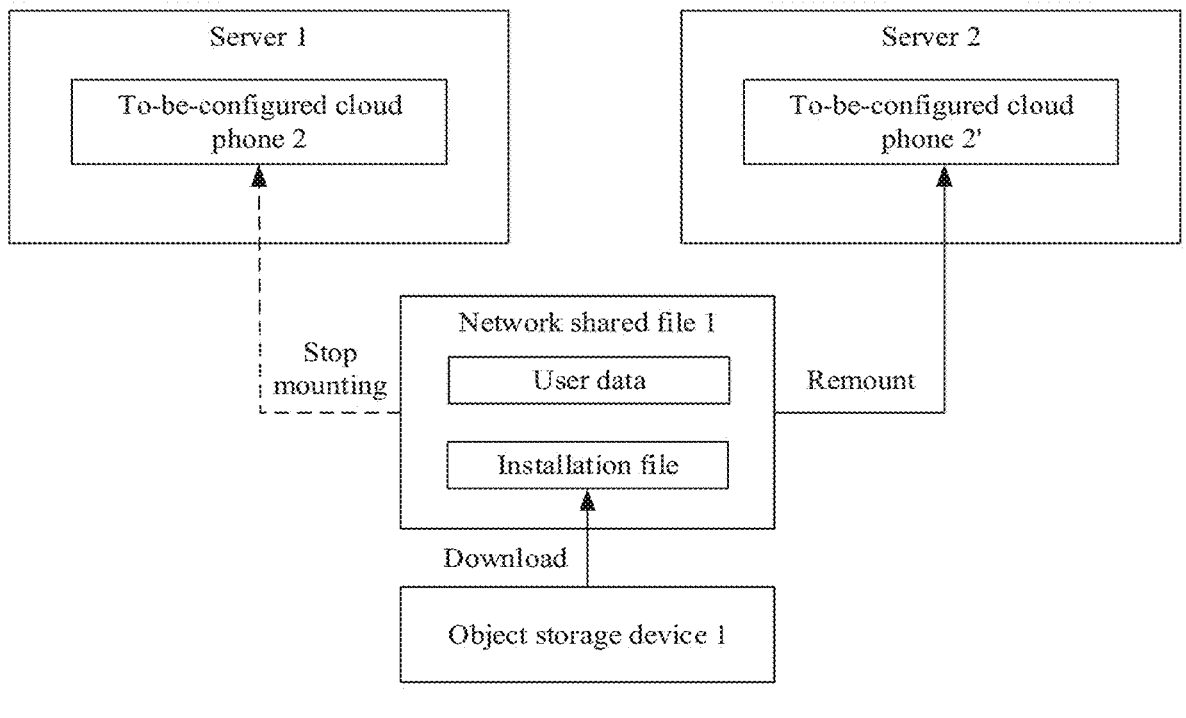

Provide a cloud phone configuration interface for a user, where the cloud phone configuration interface is configured to configure a template cloud phone based on a first input of the user, a plurality of applications are set in the template cloud phone, and a directory of the template cloud phone records installation information of the plurality of applications

S420

Provide a network shared file configuration interface for the user, where the network shared file configuration interface is configured to store the directory of the template cloud phone into a network shared file based on a second input of the user

FIG. 8

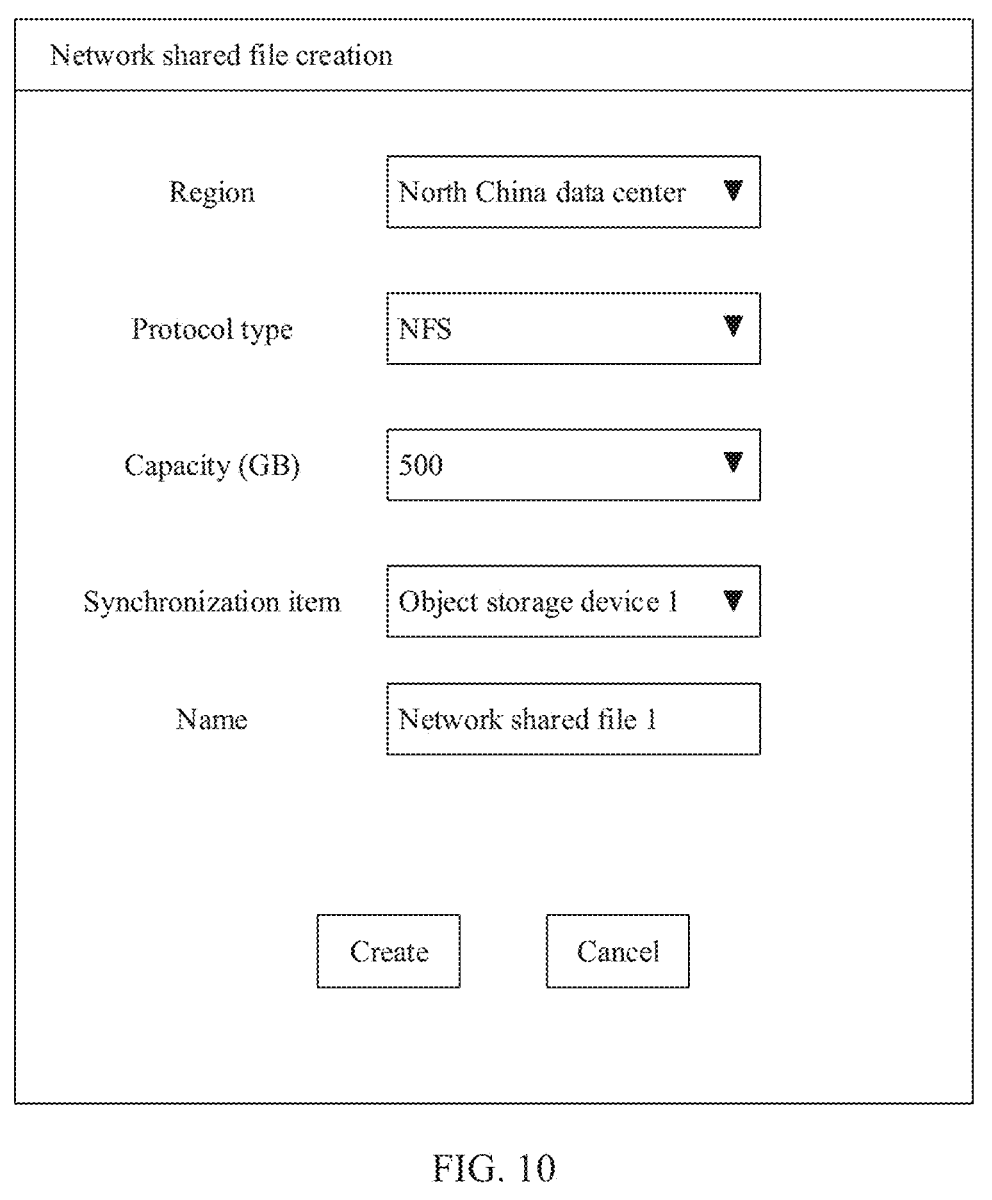

Network shared file creation

Region | North China data center ▼

Protocol type | NFS ▼

Capacity (GB) | 500 ▼

Synchronization item | Object storage device 1 ▼

Name | Network shared file 1

| Create | | Cancel |

FIG. 10

CLOUD-PHONE-BASED APPLICATION INSTALLATION METHOD, CLOUD PLATFORM, AND RELATED DEVICE

CROSS-REFERENCE TO RELATED APPLICATIONS

This is a continuation of International Patent Application No. PCT/CN2021/092955 filed on May 11, 2021, which claims priority to Chinese Patent Application No. 202010802212.7 filed on Aug. 11, 2020 and Chinese Patent Application No. 202011395057.8 filed on Dec. 3, 2020. All of the aforementioned patent applications are hereby incorporated by reference in their entireties.

TECHNICAL FIELD

This disclosure relates to the field of cloud computing technologies, and in particular, to a cloud-phone-based application installation method, a cloud platform.

BACKGROUND

A cloud phone is a cloud server that has an operating system as well as a virtual mobile phone function. The cloud phone extends and expands a physical mobile phone well, and may be applied to scenarios such as cloud mobile gaming and mobile office. In these application scenarios, an application (app) is installed in the cloud phone, an app user may remotely connect to the cloud phone by using a personal terminal device, the cloud phone transmits, to the terminal device in a form of an audio/video stream, an audio/video picture rendered during running of the application, and the terminal device displays a received audio/video stream on a screen, so that the app user can use the terminal device that has relatively limited image processing and data computing capabilities or even has only a streaming media playing capability to use the app that has a relatively high requirement on hardware resources.

Different from a use mode of the physical mobile phone, the app in the cloud phone is generally managed by a user who has purchased a cloud phone service. If a user purchases 1000 cloud phones, and each cloud phone may provide 100 apps, the 100 apps need to be installed in each cloud phone. If an installation size of each app is 1 gigabyte (GB) (an actual size may exceed 1 GB), one cloud phone requires a storage space of 100 GB, the 1000 cloud phones require a storage space of 100 terabytes (TB), and update of any one of the apps also occupies a large amount of storage space, resulting in excessively high operation and maintenance costs of a game vendor. In addition, the cloud phone with the 100 apps installed is more prone to stalling during startup and running of the apps, reducing user experience of the cloud phone.

SUMMARY

This disclosure provides a cloud-phone-based application installation method, a cloud platform, and a related device, to resolve problems that a large amount of storage space is occupied when massive cloud phones install and update applications, operation and maintenance costs are high, and stalling easily occurs in an application running process.

According to a first aspect, a cloud-phone-based application installation method is provided. The method includes the following steps: A cloud platform provides a cloud phone configuration interface for a user, to configure a template cloud phone based on a first input of the user. The cloud platform then provides a network shared file configuration interface for the user, to store a directory of the template cloud phone into a first network shared file based on a second input of the user, and then configure, based on a third input of the user, at least one to-be-configured cloud phone to mount the first network shared file, to complete installation of a plurality of applications.

The at least one to-be-configured cloud phone may be, for example, one or more to-be-configured cloud phones, which is configured during actual application based on hardware configuration of a physical server running a cloud phone. In this embodiment, a plurality of applications may be installed simultaneously in 1 to 1000 or more to-be-configured cloud phones.

By implementing the method described in the first aspect, when installing and updating massive cloud applications, the cloud platform does not need to install the applications in each cloud phone, and the to-be-configured cloud phone may mount installation information of each application from the network shared file, so that the application can be started, run, and updated without installing the application in advance, which reduces storage space occupied by the cloud phone, reduces operation and maintenance costs of the cloud phone, and improves a speed of app starting, running, and update, thereby improving user experience.

In a possible implementation of the first aspect, before providing the network shared file configuration interface, the cloud platform may further provide an object storage interface for the user, to obtain the directory of the template cloud phone and store the directory of the template cloud phone into an object storage device based on a fourth input of the user. The cloud platform may further synchronize storage of the directory, stored in the object storage device, of the template cloud phone to the first network shared file based on the second input of the user by using the network shared file configuration interface.

Optionally, before the network shared file configuration interface is provided, the method may further include the following step: providing a network shared file creation interface, where the network shared file creation interface is configured to create the network shared file based on a sixth input of the user.

Optionally, before the object storage interface is provided, the method may further include the following step: providing an object storage creation interface, where the object storage creation interface is configured to create the object storage device based on a seventh input of the user.

By implementing the foregoing implementation, the directory of the template cloud phone is first exported to the object storage device, and then the object storage device synchronizes the directory of the template cloud phone to the network shared file. The object storage device has a relatively large storage capacity, and the network shared file has a relatively small storage capacity. Therefore, installation information in the object storage device may be separately synchronized by using a plurality of network shared files, to increase a quantity of applications that can be installed by the user. In addition, the object storage device may further manage installation information exported from the template cloud phone, for example, record a storage path, version information, corresponding user information, an application name, and a type of the installation information, to further improve installation efficiency.

This disclosure provides two implementations in which the to-be-configured cloud phone mounts the network shared file. The following separately explains the two implementations.

In a possible implementation of the first aspect, the network shared file may be mounted by configuring a first multi-layer file system in the to-be-configured cloud phone. The first network shared file includes a first installation directory and a second installation directory, the second installation directory includes dynamic data of the plurality of applications, and the first installation directory includes static data of the plurality of applications. The cloud phone configuration interface is further configured to configure, based on the third input of the user, the at least one to-be-configured cloud phone to connect to the first installation directory in the first network shared file in a read-only manner. The cloud phone configuration interface is further configured to configure a first multi-layer file system in the at least one to-be-configured cloud phone based on the third input of the user, where the first multi-layer file system is configured for the at least one to-be-configured cloud phone to perform a read/write operation on the second installation directory, the first multi-layer file system includes an upper-layer directory and a lower-layer directory, the lower-layer directory is configured to connect to the second installation directory in a read-only mapping manner, the upper-layer directory is configured to store modified data generated during running of an application installed in the at least one to-be-configured cloud phone, and the first multi-layer file system is configured to overlay the upper-layer directory and the lower-layer directory.

During implementation, the first multi-layer file system may be implemented by using an overlay file system, and the read-only manner may be as follows: the first installation directory in the network shared file is mapped to the cloud phone in a soft connection manner, so that when requesting to access the first installation directory, the cloud phone jumps, by using a network, to the first installation directory stored in the network shared file. In this way, installation information under an application installation directory is obtained from the network shared file in a read-only manner through mounting.

By implementing the foregoing implementation, the to-be-configured cloud phone mounts the network shared file by using the first multi-layer file system and the read-only manner, so that not only data reading and writing during running of the application can be ensured, so that the application can be started and run in the to-be-configured cloud phone, but also the application can be updated by remounting new-version installation information, so that in a scenario in which an application is configured for massive cloud phones, the cloud platform can still install, run, and update the application without installing the application in each cloud phone, which reduces storage space occupied by the cloud phone, and reduces operation and maintenance costs of the cloud phone.

In a possible implementation of the first aspect, the to-be-configured cloud phone may mount the network shared file by configuring a second multi-layer file system in the network shared file. The cloud platform may configure, based on the third input of the user by using the network shared file configuration interface, the first network shared file to connect to the first installation directory in the first network shared file in a read-only manner, and then configure a second multi-layer file system in the first network shared file based on the third input of the user by using the network shared file configuration interface. The second multi-layer file system is configured to receive and process a data read/write request sent by the at least one to-be-configured cloud phone, the second multi-layer file system includes an upper-layer directory and a lower-layer directory, the lower-layer directory is configured to connect to the second installation directory in a read-only mapping manner, the upper-layer directory is configured to store modified data generated during running of an application installed in the first network shared file, and the second multi-layer file system is configured to overlay the upper-layer directory and the lower-layer directory.

During implementation, the second multi-layer file system may be implemented by using an overlay file system. A blank directory with the second multi-layer file system configured may be first created in the network shared file, and the to-be-configured cloud phone connects to the blank directory in a read-only manner. Then, a copied directory is created in the network shared file. The copied directory is a mirror of the directory of the template cloud phone. The blank directory with the overlay file system deployed is mounted to the copied directory, and the to-be-configured cloud phone connects to the blank directory in a read-only manner, to implement application installation of the to-be-configured cloud phone. The blank directory includes an upper-layer directory and a lower-layer directory. The lower-layer directory is configured to connect to a second installation directory in the copied directory in a read-only mapping manner, the upper-layer directory is configured to store modified data generated during running of an application installed in the first network shared file, and the second multi-layer file system is configured to overlay the upper-layer directory and the lower-layer directory. The to-be-configured cloud phone may read data from the blank directory mounted to the copied directory, and write generated modified data into the blank directory by using the second multi-layer file system of the blank directory, to implement application running in the to-be-configured cloud phone.

By implementing the foregoing implementation, not only data reading and writing during running of the application can be ensured, so that the application can be started and run in the to-be-configured cloud phone, but also the application can be updated by remounting new-version installation information, so that in a scenario in which an application is configured for massive cloud phones, the cloud platform can still install, run, and update the application without installing the application in each cloud phone, which reduces storage space occupied by the cloud phone, and reduces operation and maintenance costs of the cloud phone.

In a possible implementation of the first aspect, the network shared file includes user data, and the user data includes local service data and local habit data that are generated during running of the application. For example, when the application is a game application, user data of a mobile game application may include default account information, historical login server ID information, and the like of the user, and user data of a standalone game application may include a game clearance record, game character data, and the like. When the application is an office application, for example, user data of a mailbox application may include mailbox account binding information, mailbox business card setting, and the like of the user, and user data of an office communication application may include a historical chat record of the user, historical account information of the user, historical file information of the user, service data, and the like. It should be understood that the user data may further include private data generated by the user during running of other types of applications, which are not illustrated herein one by one.

By implementing the foregoing implementation, because all data generated during running of the application is stored in the network shared file, when the application is updated, after an updated copied directory is generated based on updated installation information, the user data can still be stored in the blank directory of the network shared file. In this way, after the application is updated, the user data can still be retained, and the user does not need to reset account information, nor needs to re-download service data or the like, thereby improving user experience.

In a possible implementation of the first aspect, the template cloud phone, the at least one to-be-configured cloud phone, and the first network shared file are located in a first data center, and when a first to-be-configured cloud phone in the at least one to-be-configured cloud phone migrates from the first data center to a second data center, the network shared file configuration interface is further configured to create, based on a fifth input of the user, a second network shared file located in the second data center, where the second network shared file is a mirror of the first network shared file.

For example, it is assumed that when a user A works in Beijing (North China), the user A runs an office application by using a cloud phone 1 and a network shared file 1 in a North China data center, and then the user A travels to work in Shenzhen (South China). In this case, the object storage device may send a request for creating a network shared file 1' to a South China data center, and then synchronize installation information of the office application to the network shared file 1', and the network shared file 1 quickly synchronizes user data generated when the user A works in Beijing to the network shared file 1', so that a cloud phone 1' mounting the network shared file 1' runs the app, while the user data is retained. The user does not need to reenter an account password or re-download service data or the like, thereby improving user experience.

By implementing the foregoing implementation, because the installation information and the user data of the application are stored in the network shared file, when the to-be-configured cloud phone migrates across data centers, the installation information and the user data of the application can still be retained, so that a problem of application installation failure or slow application installation caused by non-communication of data between data centers across regions is avoided, and user experience is improved.

In a possible implementation of the first aspect, the network shared file configuration interface is further configured to configure, based on the sixth input of the user, the first to-be-configured cloud phone migrating to the first data center to mount the second network shared file, to complete installation of the plurality of applications. For example, assuming that a cloud phone 2 used by a user migrates from a server 1 to a server 2, running of the cloud phone 2 may be stopped first, mounting between the cloud phone 2 and a network shared file is then canceled, then a cloud phone 2' is created in the server 2, a mount directory in the network shared file is provided to the cloud phone 2', and the cloud phone 2' mounts the network shared file by using the mount directory, to implement cloud phone resource migration.

By implementing the foregoing implementation, because the installation information and the user data of the application are stored in the network shared file, when the to-be-configured cloud phone migrates between servers in a data center, the cloud phone after migration remounts the network shared file to implement application installation of the cloud phone after migration, which shortens a speed of resource migration in the data center to seconds, thereby improving user experience.

In a possible implementation of the first aspect, a server end may be deployed in the network shared file, and a client may be deployed in the to-be-configured cloud phone. The client is configured to send read/write input/output (TO) requests (for example, a request for writing modified data generated during running of the app into the second installation directory, and a request for reading the first installation directory) generated by the to-be-configured cloud phone to the server end of the network shared file after aggregating the requests. The server end is configured to receive the read/write IO requests sent by the client, and send the read/write IO requests to the second multi-layer file system after splitting the requests, so that the second multi-layer file system implements read/write operations on the installation information. During implementation, the network shared file may first cache a received IO request into an internal memory, and after receiving an IO request sent by the to-be-configured cloud phone, first update data in the cache, and then generate an asynchronous IO request. Then, IO requests for a large quantity of small files are aggregated into a single IO request, and aggregated IO data is sent to the server end at a time. The server end may parse received IO requests and then update the requests to a storage medium in batches.

By implementing the foregoing implementation, IO requests in the to-be-configured cloud phone may be sent to the client, and the client sends received IO requests to the server end for processing after aggregating the requests, thereby reducing a quantity of IO requests received by the network shared file, reducing processing pressure of the network shared file, and improving efficiency of starting, running, updating, and uninstalling the app.

It may be understood that, the to-be-configured cloud phone may also update an application by using the cloud-phone-based application installation method. The cloud platform may install an updated application in the template cloud phone, and export the new-version installation information to the object storage device (or the user operates the template cloud phone to update the application, which is not limited in this disclosure). The object storage device synchronizes the new-version installation information to the network shared file, the network shared file may provide a new mount directory for the to-be-configured cloud phone (certainly, a mount directory may remain unchanged, but only installation information under the mount directory is updated), and the to-be-configured cloud phone may remount the new-version installation information in the network shared file based on the new mount directory, to update the app.

Similarly, an application may be uninstalled by deleting installation information of the application in the object storage device and the network shared file, and the user does not need to operate each cloud phone to perform an uninstallation operation, thereby improving user experience.

Optionally, the template cloud phone and the to-be-configured cloud phone include a virtual machine, a container, and a bare metal server (BMS).

Optionally, the applications include a game application, a work application, an educational application, a video application, a social application, and a virtual reality application.

Optionally, the user may purchase a template cloud phone by using a console or an application programming interface (API), and operate the template cloud phone to install a required application, and then the cloud platform creates a network shared file and an object storage device, and configures the network shared file, the object storage device, and a to-be-configured cloud phone, so that the to-be-configured cloud phone mounts the network shared file to implement application installation.

Optionally, the user may purchase a template cloud phone by using a console or an API, and operate the template cloud phone to install a required application, and then create and configure a network shared file, an object storage device, and a to-be-configured cloud phone by using various interfaces provided by the cloud platform, so that the to-be-configured cloud phone mounts the network shared file to implement application installation. The interface may be an API interface, or may be a web page, an application program, or a console in another form. This is not limited in this disclosure.

Optionally, the user may further upload, by using the console or the API, a list of applications that need to be installed and a quantity x of to-be-configured cloud phones. The cloud platform creates a template cloud phone, a network shared file, and an object storage device based on the application quantity and the application list that are uploaded by the user, installs, in the template cloud phone, the applications in the application list, and then exports a directory of the template cloud phone to the object storage device. Installation information in the object storage device is synchronized to the network shared file, and x cloud phones are configured to mount the network shared file. In this way, the applications in the application list are installed in the x cloud phones as required by the user. A user operation in the entire cloud phone application installation is very convenient, thereby improving user experience.

According to a second aspect, a cloud platform is provided, including: a cloud phone configuration interface providing unit, configured to provide a cloud phone configuration interface, where the cloud phone configuration interface is configured to configure a template cloud phone based on a first input of a user, a plurality of applications are set in the template cloud phone, and a directory of the template cloud phone records installation information of the plurality of applications; and a network shared file configuration interface providing unit, configured to provide a network shared file configuration interface, where the network shared file configuration interface is configured to store the directory of the template cloud phone into a first network shared file based on a second input of the user; and the cloud phone configuration interface is further configured to configure, based on a third input of the user, at least one to-be-configured cloud phone to mount the first network shared file, to complete installation of the plurality of applications.

The second aspect or any implementation of the second aspect is an apparatus implementation corresponding to the first aspect or any implementation of the first aspect. The description in the second aspect or any implementation of the second aspect is applicable to the first aspect or any implementation of the first aspect, and details are not described herein again.

According to a third aspect, a computer-readable storage medium is provided, including instructions. When the instructions are run on a computing device, the computing device is enabled to perform the method described in the first aspect.

According to a fourth aspect, a computing device is provided, including a processor and a memory. When the processor executes code in the memory, the computing device is enabled to implement the method described in the first aspect.

According to a fifth aspect, a computer program product is provided. When the computer program product is read and executed by a computing device, the method described in the first aspect is implemented.

BRIEF DESCRIPTION OF DRAWINGS

To describe the technical solutions in embodiments of this disclosure or in other technologies more clearly, the following briefly describes the accompanying drawings for describing embodiments or the other technologies.

FIG. 7 is a schematic flowchart of migration of a to-be-configured cloud phone in a data center according to this disclosure.

FIG. 8 is a schematic flowchart of steps of a cloud-phone-based application installation method according to this disclosure.

FIG. 10 is a schematic diagram of another console interface according to this disclosure.

DESCRIPTION OF EMBODIMENTS

Figures 1A, 1B:
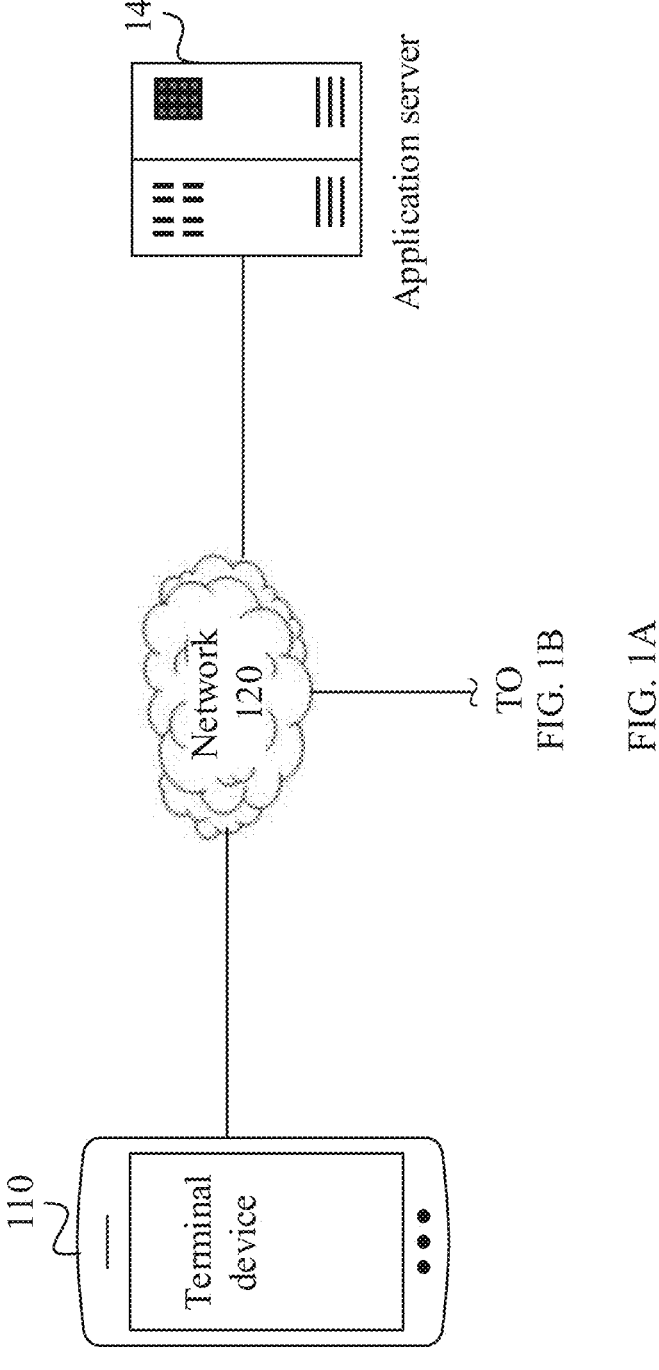
FIG. 1A and FIG. 1B are a schematic diagram of an architecture of a public cloud system.
Figures 1A, 1B:
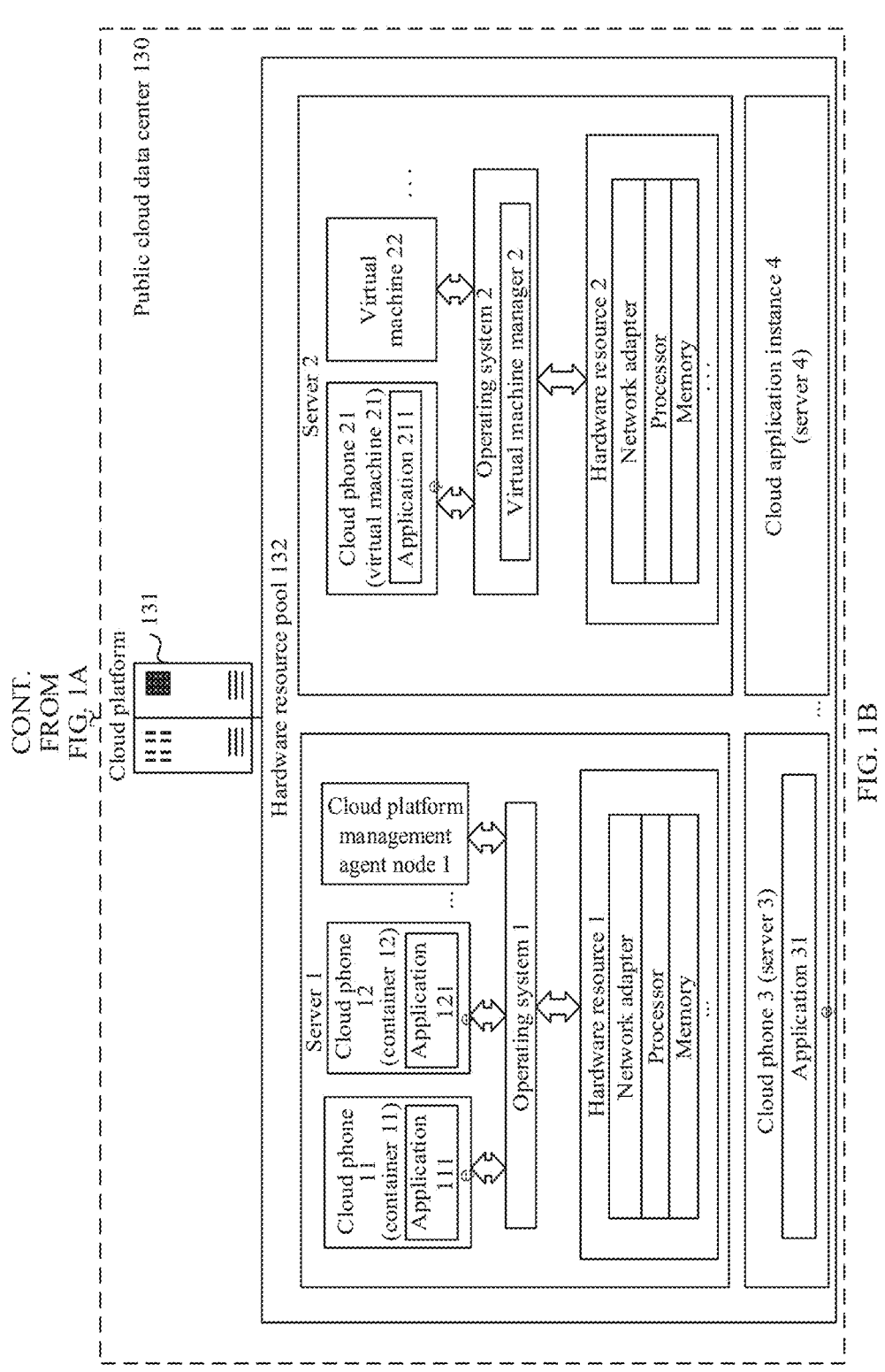

The following describes the technical solutions in embodiments of this disclosure with reference to the accompanying drawings in embodiments of this disclosure. It is clear that the described embodiments are merely a part rather than all of embodiments of this disclosure. All other embodiments obtained by a person of ordinary skill in the art based on embodiments of this disclosure without creative efforts shall fall within the protection scope of this disclosure.

For ease of understanding embodiments of this disclosure, some terms in this disclosure are first explained.

Container: The container is a group of processes that are isolated from each other due to resource constraints.

Cloud phone: It is a container, a virtual machine, or a BMS that is virtualized in a physical server and that has a mobile phone operating system as well as a virtual mobile phone function. In essence, an application in a mobile phone is transferred to a container, a virtual machine, or a BMS in a public cloud for running. Different cloud phones are isolated from each other and do not interfere with each other. An application of a local mobile phone may be installed in the cloud phone. The application runs in the cloud phone, and an audio/video stream generated during running may be sent to a local terminal device of a user for display and playing. A control command generated by the local terminal device of the user based on the displayed and played audio/video stream may be sent to the cloud phone, and the cloud phone controls a running status of the application based on the control command, so that the application of the local mobile phone may be transferred to the cloud phone for running, the local terminal device of the user does not need to install a large quantity of applications that consume hardware resources, and applications can be lightweight.

Public cloud: A core attribute of the public cloud is a shared resource service, which refers to a cloud infrastructure and service that are provided by a cloud provider for a user (also referred to as a tenant) and that can be used by using a public network (such as the Internet). The cloud infrastructure and service are set in a data center of the cloud provider, and the user may use the cloud infrastructure and service remotely by paying the cloud provider for permission to use the cloud infrastructure and service.

Object storage service (OBS): It is an object-based massive storage service in the public cloud, and may provide customers with a massive, secure, reliable, and low-cost data storage capability. The OBS is a service based on Internet access, and provides a web service interface based on Hypertext Transfer Protocol (HTTP)/Hypertext Transfer Protocol Secure (HTTPS). A user may use an OBS management console or various OBS tools on a computer connected to the Internet, to access and manage data stored in the OBS anytime and anywhere.

Scalable file service (SFS): It is a service that is in the public cloud and that provides a high-performance file system that can be expanded as required. The SFS may provide shared access for a plurality of elastic cloud servers (ECS), containers, and BMSs in the public cloud. Generally, after creating a file system, a user may mount the file system by using cloud servers, so that the plurality of cloud servers share the file system.

Mounting: It is a process in which an operating system enables a file and a directory in a storage device (such as a hard disk or a shared resource) to be accessed by a user by using a file system of a held device. For example, when the user accesses a file A in the storage device, if the file A is mounted to a directory B, the user may access the file A in the storage device by accessing the directory B. The directory B is also referred to as a mount point. The mount point may be in the device held by the user, or may be in the storage device, or may be in a virtual disk or a virtual folder.

Second, an application scenario of the "public cloud" in this disclosure is briefly described.

With rapid development of cloud computing technologies and various network infrastructures, an Internet technology (IT) service architecture gradually migrates to the public cloud, and an increasing quantity of service applications are redesigned and used based on a public cloud architecture. In the public cloud architecture, an application in a terminal device 110 of a user is installed in a cloud phone, the cloud phone may transmit, to the terminal device 110 in a form of an audio/video stream, an audio/video picture rendered during running of the application, and the terminal device 110 needs to only display a received audio/video stream on a screen, so that the application is truly free of downloading and installation, and is used when clicked.

FIG. 1A and FIG. 1B are a schematic diagram of an architecture of a public cloud system. As shown in FIG. 1A and FIG. 1B, the system includes a terminal device 110, a public cloud data center 130, and an application service node 140, and the terminal device 110, the public cloud data center 130, and the application service node 140 are connected by using a network 120. The network 120 may be a public network, such as the Internet.

The terminal device 110 may be an electronic device that has a streaming media playing capability, such as a smartphone, a palmtop processing device, a tablet computer, a mobile notebook, a virtual reality device, a wearable device, or an integrated palmtop. FIG. 1A and FIG. 1B show an example in which the terminal device 110 is a smartphone for description. However, this disclosure does not set a limitation thereto.

The application service node 140 is configured to provide various application services for a user. The application service node 140 may include a game service node, an education application service node, a video application service node, a social application service node, a virtual reality application service node, and the like. This is not limited in this disclosure.

The public cloud data center 130 may provide a shared resource service for a user. The shared resource service may include an OBS service, an SFS service, a cloud phone service, a content delivery network (CDN) service, a cloud backup and recovery (CBR) service, a data administration service (DAS), and the like. A type of the shared resource service that can be provided by the public cloud data center 130 is not limited in this disclosure. During implementation, an individual user may rent, by using the network 120, a cloud infrastructure and service owned by the public cloud data center 130, and use, by using a rented shared resource, an application service provided by the application service node 140. For example, a virtual machine of the public cloud is rented to experience a high-quality standalone game, or a cloud phone of the public cloud is rented to experience a high-definition mobile game. An enterprise user may purchase a cloud service for use by an enterprise. For example, a virtual machine of the public cloud is rented as a server of the enterprise. Alternatively, the purchased cloud service may be used by another user. For example, a game vendor may purchase a plurality of cloud phones or virtual machines to run a cloud game platform service. When starting a game, a game user of the game vendor may remotely connect, by using a terminal device of the game user, to a cloud phone or a virtual machine purchased by the game vendor, so that the game user can use the terminal device that has relatively limited image processing and data computing capabilities or even has only a streaming media playing capability to use an application that has a relatively high requirement on hardware resources. It should be understood that the foregoing examples are used for description, but do not constitute limitations.

For example, the public cloud data center 130 may include a cloud platform 131 and a hardware resource pool 132. It should be understood that the division manner shown in FIG. 1A and FIG. 1B is used for illustration, and the public cloud data center 130 may alternatively be divided in another manner. A division manner of the public cloud data center 130 is not limited in this disclosure.

The cloud platform 131 may be implemented by a general physical server, for example, an ARM server or an X86 server, or may be a virtual machine implemented with reference to a network functions virtualization (NFV) technology. Alternatively, the cloud platform 131 may be a virtual machine or a physical server in the hardware resource pool 132. This is not limited in this disclosure.

The hardware resource pool 132 may include at least one physical server (FIG. 1A and FIG. 1B show an example in which the resource pool includes a server 1, a server 2, a server 3, and a server 4 for description). The physical server may be a general physical server, for example, an ARM server or an X86 server. This is not limited in this disclosure. There is an internal network connection between the physical server in the hardware resource pool 132 and the cloud platform, and each physical server may communicate with another physical server and the cloud platform 131 by using an internal network.

Each physical server may run at least one cloud phone. The public cloud data center 130 may provide a cloud phone rental service for a user, for example, charge based on a hardware specification of a cloud phone required by the user, and the user may install and use a required application in the rented cloud phone. Alternatively, the public cloud data center 130 may install various applications in a cloud phone in advance, and provide a user with a service of renting an application in the cloud phone, for example, charge based on a usage duration of the application. For example, as shown in FIG. 1A and FIG. 1B, assuming that a user needs to use an application 111, the user may send a purchase request to the cloud platform 131 to rent a cloud phone, and the cloud platform 131 may allocate, based on a resource usage status in the hardware resource pool, a cloud phone 11 in which the application 111 is installed to the user for use. It should be understood that regardless of whether the cloud phone is rented or the application is rented, the terminal device 110 may remotely operate the application in the cloud phone after payment. The cloud phone may respond to the remote operation of the user, and send a correspondingly generated audio/video stream to the terminal device 110 for display and playing, so that the user can use a terminal device 110 that has relatively limited image processing and data computing capabilities or even a terminal device 110 that has only a streaming media playing capability, to use the application that has a relatively high requirement on hardware resources.

During implementation, as shown in FIG. 1A and FIG. 1B, the cloud phone may be any one of a virtual machine (for example, a virtual machine 21), a container (for example, a container 11 and a container 22), and a BMS (for example, the server 3) in FIG. 1A and FIG. 1B. If the cloud phone is implemented by using a container, the cloud platform 131 may notify, based on a running environment required by an application, a cloud platform management agent node of a server to create the container, and install the application 111 in the cloud phone. If the cloud phone is implemented by using a virtual machine, the cloud platform 131 may create a virtual machine by using a virtual machine manager based on a running environment required by an application, and install the application 111 in the cloud phone. If the cloud phone is a BMS, the cloud platform 131 may select a proper BMS based on a running environment required by an application, and install the application 111 in the BMS, to obtain a cloud phone in which the application 111 is installed. In this disclosure, the cloud phone is a virtual resource in the public cloud data center 130, and the virtual resource runs a mobile phone operating system. A form of the cloud phone is not limited in this disclosure.

It should be understood that, after the terminal device 110 stops remotely operating the application 111 in the cloud phone, the cloud platform 131 may release the cloud phone (that is, the container 11), and the released resource may be used by another user. When the terminal device 110 requests to remotely operate the application 111 in the cloud phone again, the cloud platform 131 may create another cloud phone in which the application 111 is installed for use by the user.

In conclusion, in the public cloud architecture, an application of a user is installed in a cloud phone, the cloud phone may transmit, to a terminal device in a form of an audio/video stream, an audio/video picture rendered during running of the application, and the terminal device needs to only display a received audio/video stream to the user, so that the application is truly free of downloading and installation.

However, for an enterprise user that rents cloud phones to operate a service, after purchasing a large quantity of cloud phones, an application needs to be deployed in the cloud phones in advance. For example, a game vendor that rents cloud phones for use by game user needs to install, in each cloud phone in advance, a plurality of games owned by the game vendor. If the game vendor operates 100 games and purchases 1000 cloud phones, the 100 game apps need to be installed in each cloud phone. If an installation size of each game app is 1 GB (an actual size may exceed 1 GB), one cloud phone requires a storage space of 100 GB, the 1000 cloud phones require a storage space of 100 T, and update of any game app also occupies a large quantity of storage resources, resulting in excessively high operation and maintenance costs of the game vendor. In addition, the cloud phone with the 100 apps installed is more prone to stalling during startup and running of the apps, reducing user experience.

Figure 2:
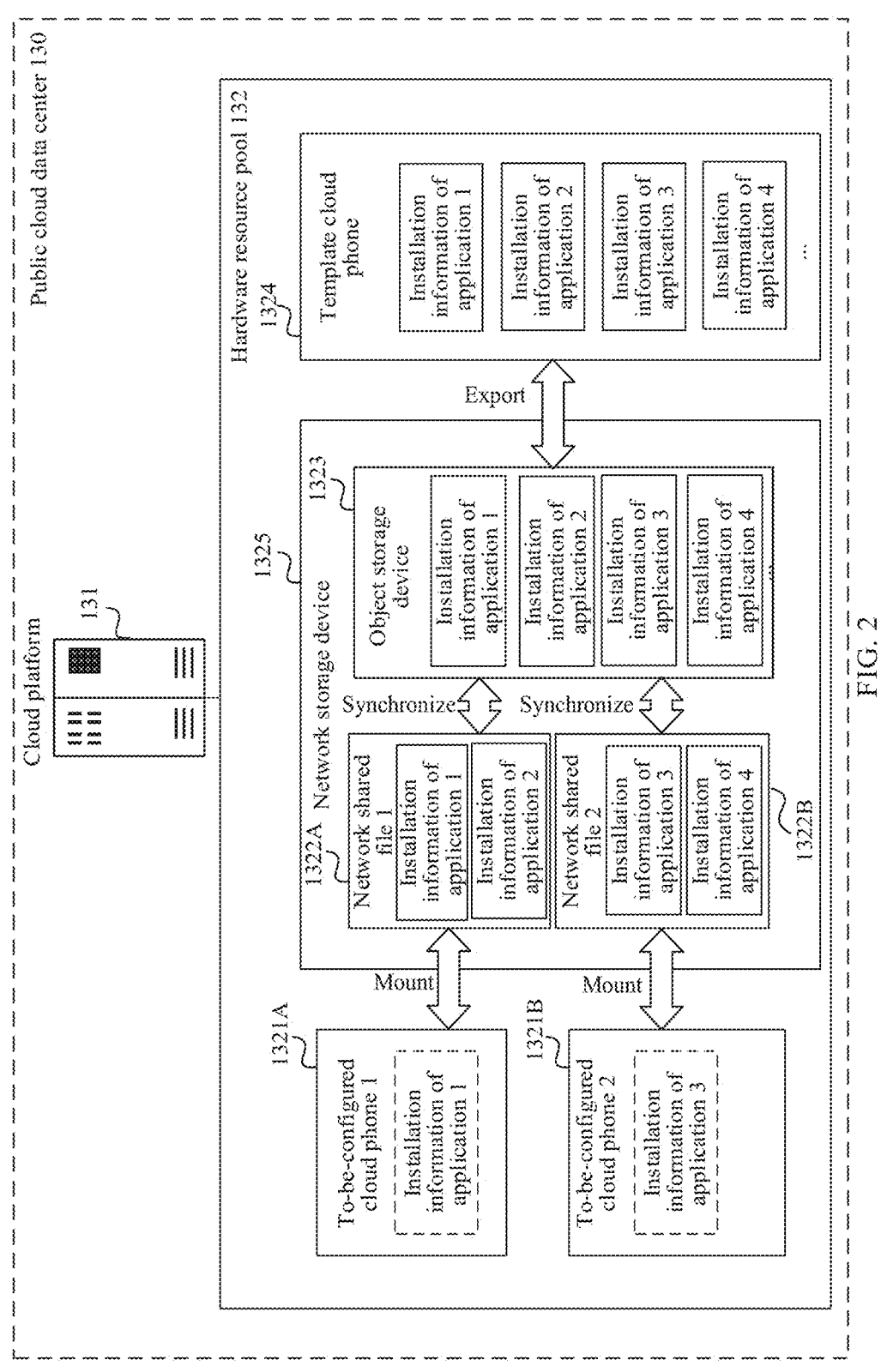
FIG. 2 is a schematic diagram of a structure of a cloud-phone-based application installation system according to this disclosure.

To resolve the foregoing problems that operation and maintenance costs of an application vendor purchasing cloud phones are excessively high because applications need to be installed in the cloud phones in advance, and a cloud phone with a large quantity of applications is prone to stalling during startup and running of the applications, this disclosure provides a cloud-platform-based cloud phone application installation system. As shown in FIG. 2, the system may be deployed in the public cloud data center 130 in the embodiment in FIG. 1A and FIG. 1B. The system may include a cloud platform 131 and a hardware resource pool 132. The hardware resource pool 132 may include a template cloud phone 1324, at least one to-be-configured cloud phone 1321, and a network storage device 1325. FIG. 2 shows two to-be-configured cloud phones as an example for description. A quantity of to-be-configured cloud phones is not limited in this disclosure.

The template cloud phone 1324 and the to-be-configured cloud phone 1321 may be any one of the containers, the virtual machine, and the BMS in the embodiment in FIG. 1A and FIG. 1B. For details, refer to the description about the cloud phone in the foregoing content. Details are not described herein again.

The network storage device 1325 is configured to provide a storage service, and may be either of the virtual machine and the BMS in the embodiment in FIG. 1A and FIG. 1B. Optionally, the network storage device 1325 may include an object storage device 1323 and a network shared file 1322. During implementation, the object storage device 1323 may be a cloud storage service, for example, an OBS service, in the public cloud, which is created by the cloud platform 131, and may store unstructured data in any amount and form. The network shared file 1322 may be a network-based file system service, for example, an SFS service, in the public cloud, which is created by the cloud platform 131. The SFS service may provide shared access for a plurality of servers (which may be one or more of the virtual machine, the container, and the BMS). During implementation, a file system created by the SFS service may be any network file system (NFS) that supports an NFS protocol, or may be an NFS such as CIFS/SMB. A file system type of the network shared file 1322 is not limited in this disclosure.

In this embodiment of this disclosure, a plurality of applications required by a user may be installed in the template cloud phone 1324, and after installation information of the plurality of applications are generated, a directory (including the installation information of the plurality of applications) of the template cloud phone is stored in the object storage device. The cloud platform 131 may store the directory of the template cloud phone into the object storage device 1323 based on a second input of the user. The object storage device 1323 synchronizes storage of the stored directory of the template cloud phone to the network shared file 1322. The network shared file 1322 may provide a mount directory for the at least one to-be-configured cloud phone. When an app user uses a to-be-configured cloud phone, the to-be-configured cloud phone may access installation information in the network shared file 1322 by using the mount directory, to start and run an application. In this way, internal memory occupation of the cloud phone is reduced, user experience is improved, and operation and maintenance costs of an application vendor are reduced.

During implementation, the object storage 1323 may perform global storage and management on the installation information of the plurality of applications that is exported from the template cloud phone 1324, for example, classification management and version management on installation information of each application, and management on a mapping between each application and the network shared file 1322. In addition, FIG. 2 shows, for description, an example in which a user installs four applications in the template cloud phone, one network shared file synchronizes installation information of two applications, and one network shared file provides a mount directory for one to-be-configured cloud phone. During implementation, a quantity of applications synchronized by each network shared file may be determined based on a storage capacity of the network shared file. This disclosure does not limit a quantity of applications installed in the template cloud phone, a quantity of applications synchronized by the network shared file 1322, or a quantity of to-be-configured cloud phones to which the network shared file 1322 is mounted.

It should be noted that, because a storage capacity of a file system is limited, one object storage device 1323 may be connected to a plurality of network shared files 1322. For example, a game vendor owns 100 games, and installation information of all the 100 games is stored in the object storage device 1323. However, one network shared file can store an installation directory and an external storage directory of only 50 games. Therefore, the object storage device may be connected to two network shared files, a network shared file A is responsible for directory mounting of the first 50 games, and a network shared file B is responsible for directory mounting of the second 50 games. It should be understood that the foregoing example is used for description, and quantities of object storage devices 1323 and network shared files 1322 are not limited in this disclosure.

It may be understood that the network storage device shown in FIG. 2 may be divided in a plurality of manners. FIG. 1A and FIG. 1B are merely an example division manner. In addition, each module may be a software module, or may be a hardware module, or may be a combination of a software module and a hardware module. This is not limited in this disclosure. For example, in some application scenarios, the network storage device may include only the network shared file 1322. It should be understood that, if an enterprise user needs to install a relatively small quantity of applications, and does not have a requirement for globally managing installation information of the plurality of applications, for example, if a game vendor needs to install only one game in a cloud phone, installation information generated after the game is installed may be exported from the template cloud phone to the network shared file 1322, and the network shared file 1322 provides a mount point for a to-be-configured cloud phone for directory mounting. It should be understood that the foregoing example is used for description, and this disclosure sets no limitation thereto.

Similarly, when an app is updated, updated installation information may be first exported to the object storage device 1323 and then synchronized to the network shared file 1322, and the cloud phone may remount the updated installation information, to implement application update. Therefore, with the application installation system provided in this disclosure, if a game vendor operates 1000 games and purchases 1000 cloud phones, when a game A in the 1000 games needs to be updated, updated installation information may be exported to the object storage device, and the object storage device synchronizes the updated installation information to the network shared file. When a game user starts the game A by using a cloud phone, the cloud phone may mount the updated installation information from the network shared file. In this way, the app is updated without occupying a large amount of storage space and system resources of the cloud phone, which not only reduces operation costs of the enterprise user, but also reduces stalling that easily occurs during startup of the cloud phone and starting and running of the app, thereby improving user experience.

In conclusion, with the cloud-phone-based application installation system provided in this disclosure, an application does not need to be installed in each cloud phone, but instead, installation information of the application is synchronized to the network shared file. Each time a user uses each application by using a cloud phone, the cloud phone may mount installation information of each application from the network shared file, so that the application can be started, run, and updated without installing the application in advance. This reduces internal memory occupation of the app in the cloud phone, and greatly reduces operation and maintenance costs of an application vendor. In addition, the app can be started, run, and updated faster, thereby improving user experience.

With reference to an accompanying drawing, the following describes in detail a step process of how the cloud-phone-based application installation system shown in FIG. 2 performs application installation.

Figure 3:
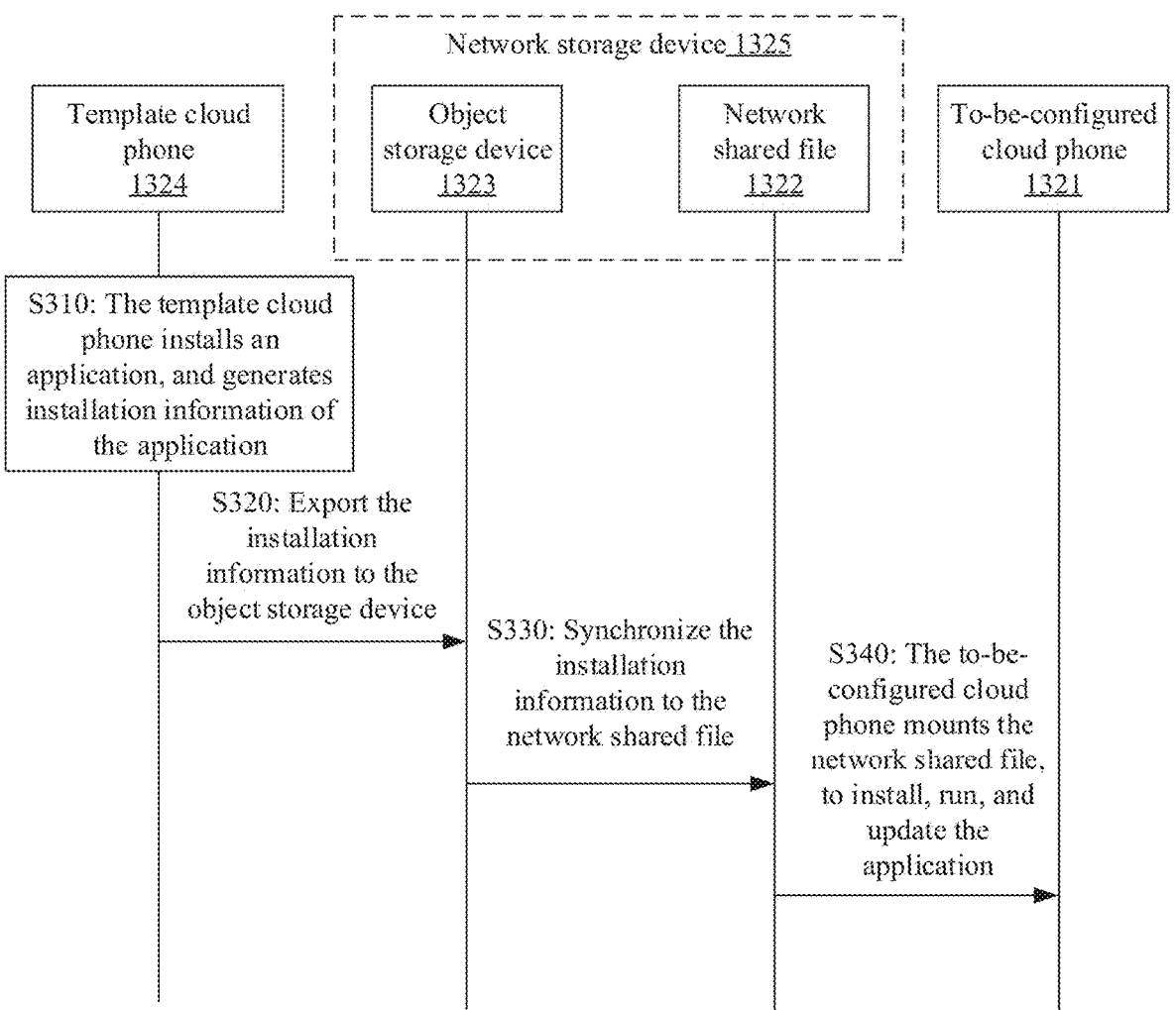
FIG. 3 is a schematic flowchart of steps of a cloud-phone-based application installation method according to this disclosure.

As shown in FIG. 3, this disclosure provides a cloud-phone-based application installation method. The method is applied to the application installation system shown in FIG. 2. For description of the system, refer to the embodiments in FIG. 1A and FIG. 1B, and FIG. 2. Details are not described herein again. The method includes the following steps.

S310: The template cloud phone 1324 installs an app, and generates installation information of the application.

In an embodiment, when the app is installed in the template cloud phone 1324, an operating system of the template cloud phone 1324 installs, in a path by the template cloud phone 1324, data in an installation package of the app. The generated installation information may generally include a first installation directory and a second installation directory. The second installation directory includes dynamic data of a plurality of applications, and the first installation directory includes static data of the plurality of applications. Simply, the static data refers to data that is not modified during running of the app in a cloud phone, and the dynamic data refers to data that is modified during running of the app. An ANDROID operating system is used as an example. The first installation directory may be an application installation directory, and the second installation directory is an external storage directory. The application installation directory stores application installation information such as an apk file, a lib library, and an oat file of the app, a path is/data/App/{App_package}, and data under the directory is not modified during running of the app. The external storage directory stores an application running process file, such as equipment information and a game version in a game application, a path is /data/media/0/ Android/data/{App_package}, and data under the directory is modified during running of the app. It should be understood that the files and paths stored in the first installation directory and the second installation directory are used for illustration. The first installation directory and the second installation directory have different paths and store different installation information in different operating systems (such as an IOS operating system and a Harmony operating system). Examples are not described one by one in this disclosure.

S320: The template cloud phone 1324 exports the installation information to the object storage device 1323. The object storage device 1323 is an object storage device 1323 that is created by the cloud platform after an enterprise user purchases a cloud phone and that corresponds to the enterprise user. The object storage device 1323 may perform storage management on installation information of an application installed by the enterprise user in the template cloud phone.

The template cloud phone may compress and pack the installation information, for example, compress the installation information into a file in a tar.gz format, and then upload the installation information to the object storage device 1323. The object storage device 1323 may decompress received installation information and store the installation information into a storage medium, for example, an OBS data bucket of the user. It should be understood that in a public cloud, each user has a corresponding OBS data bucket. Therefore, it is convenient to store the installation information in the OBS data bucket of the user, and the object storage device 1323 does not need to further apply for a storage resource from the cloud platform, thereby improving processing efficiency. Certainly, the object storage device 1323 may alternatively store the installation information into another storage medium, for example, an OBS data bucket corresponding to the object storage device 1323. This is not limited in this disclosure. Optionally, the object storage device 1323 may further record a storage path, version information, corresponding user information, an application name and type, and the like of the installation information. A type of storage management performed by the object storage device 1323 on the installation information is not limited in this disclosure.

S330: The object storage device 1323 synchronizes the installation information to the network shared file 1322.

During implementation, when the object storage device 1323 have no network shared file 1322 corresponding to the object storage device 1323 (that is, when the user installs an application in the template cloud phone for the first time), or when a remaining storage space of a current object storage device 1323 is insufficient, the object storage device 1323 may first send a request for creating a network shared file 1322 to the cloud platform 131. After the cloud platform 131 creates a network shared file 1322, the object storage device 1323 sends the installation information to the network shared file 1322, and records a correspondence between the installation information and the network shared file 1322. In this way, after receiving an updated version of the installation information, the object storage device 1323 may determine, based on the correspondence, the network shared file 1322 corresponding to the installation information, and then send the updated version of the installation information to the corresponding network shared file 1322, to update the application installation information. It should be noted that, a directory structure of the installation information in the network shared file 1322 is consistent with a directory structure of the object storage device 1323, and is also consistent with a directory structure of the installation information generated after the template cloud phone 1324 installs the app.

S340: The to-be-configured cloud phone 1321 accesses the installation information by mounting the network shared file, to start, run, and update the application. The network shared file may provide a mount directory (mount point), for example, /data/share_app_center, for the to-be-configured cloud phone 1321 so that the to-be-configured cloud phone may access the installation information in the network shared file 1322 by using the mount directory, to start and run the application. In this way, internal memory occupation of the cloud phone is reduced, user experience is improved, and operation and maintenance costs of an application vendor are reduced.

This disclosure provides two methods for the to-be-configured cloud phone to start, run, and update the app by mounting the installation information in the network shared file 1322. The following separately explains the two methods in detail.

1. File mounting is implemented by deploying a first multi-layer file system in the to-be-configured cloud phone.

In an embodiment, it can be learned with reference to the foregoing content that, the installation information generated after the app is installed in the phone includes the first installation directory and the second installation directory, the first installation directory is not modified during running of the app, and modified data generated during running is written into the second installation directory. Therefore, the to-be-configured cloud phone 1321 may mount the first installation directory from the network shared file in a read-only manner, and then write modified data into the second installation directory by using the first multi-layer file system, to start and run the app in the to-be-configured cloud phone 1321.

The first multi-layer file system may include at least an upper-layer directory and a lower-layer directory. The lower-layer directory is the second installation directory in the network shared file 1322. The upper-layer directory is configured to store modified data. After the first multi-layer file system combines the upper-layer directory and the lower-layer directory, during running of the app, an operating system may access the first multi-layer file system to implement reading and writing of the second installation directory, thereby running the app in the to-be-configured cloud phone 1321. It should be understood that the modified data may be a login date recorded when a game is started, game data generated during running of the game, and the like. A directory structure of the upper-layer directory is a preset directory structure, and an applicable preset directory structure may be determined based on an application scenario to store the modified data. This is not limited in this disclosure.

Figure 4A:
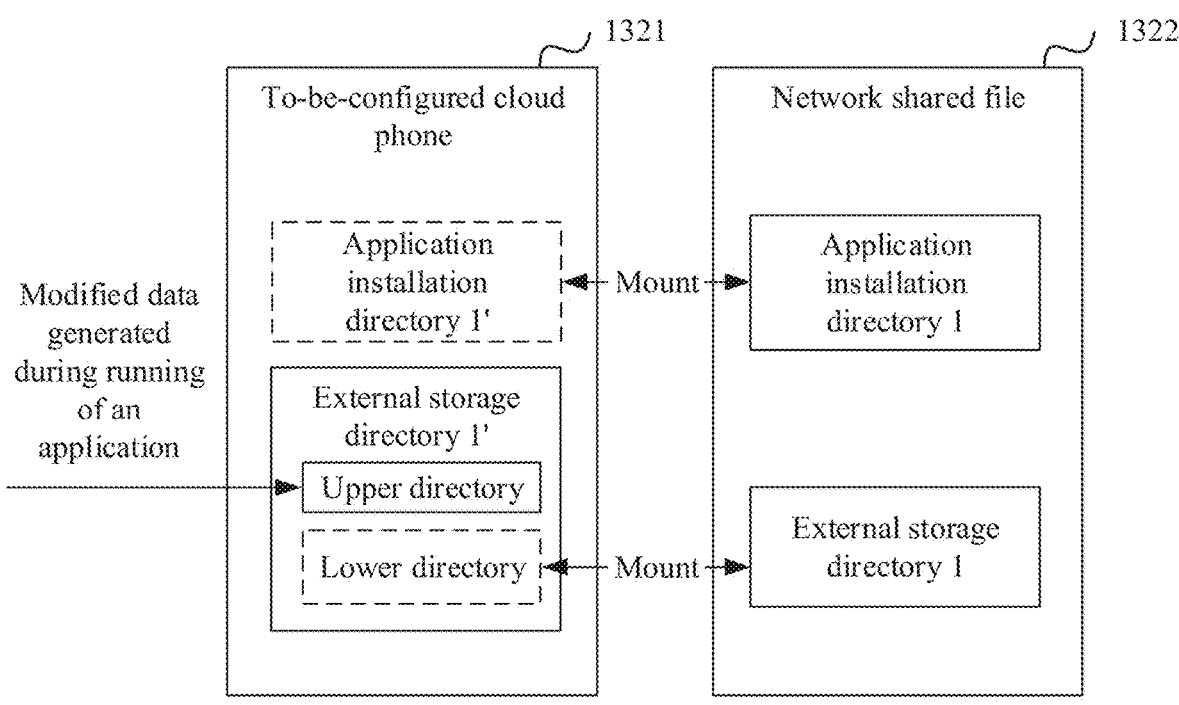
FIG. 4A and FIG. 4B are schematic diagrams of structures in which a to-be-configured cloud phone mounts a network shared file according to this disclosure.

For example, as shown in FIG. 4A, it is assumed that the operating system of the to-be-configured cloud phone is the ANDROID operating system, installation information of an app has been synchronized from the object storage device 1323 to the network shared file 1322, and in the installation information of the app, a first installation directory is an application installation directory 1, and a second installation directory is an external storage directory 1. When the to-be-configured cloud phone 1321 runs the app, the operating system accesses an application installation directory 1' or an external storage directory 1'. The application installation directory 1' is implemented by mounting to the application installation directory 1 in the network shared file 1322 in a read-only manner. The external storage directory 1' is a combined directory of an upper-layer directory and a lower-layer directory. The lower-layer directory may be implemented by mounting the external storage directory 1. The upper-layer directory is a preset directory structure, and stored data is modified data generated during running of the app. In this way, the app is run in the to-be-configured cloud phone 1321.

Figure 4B:
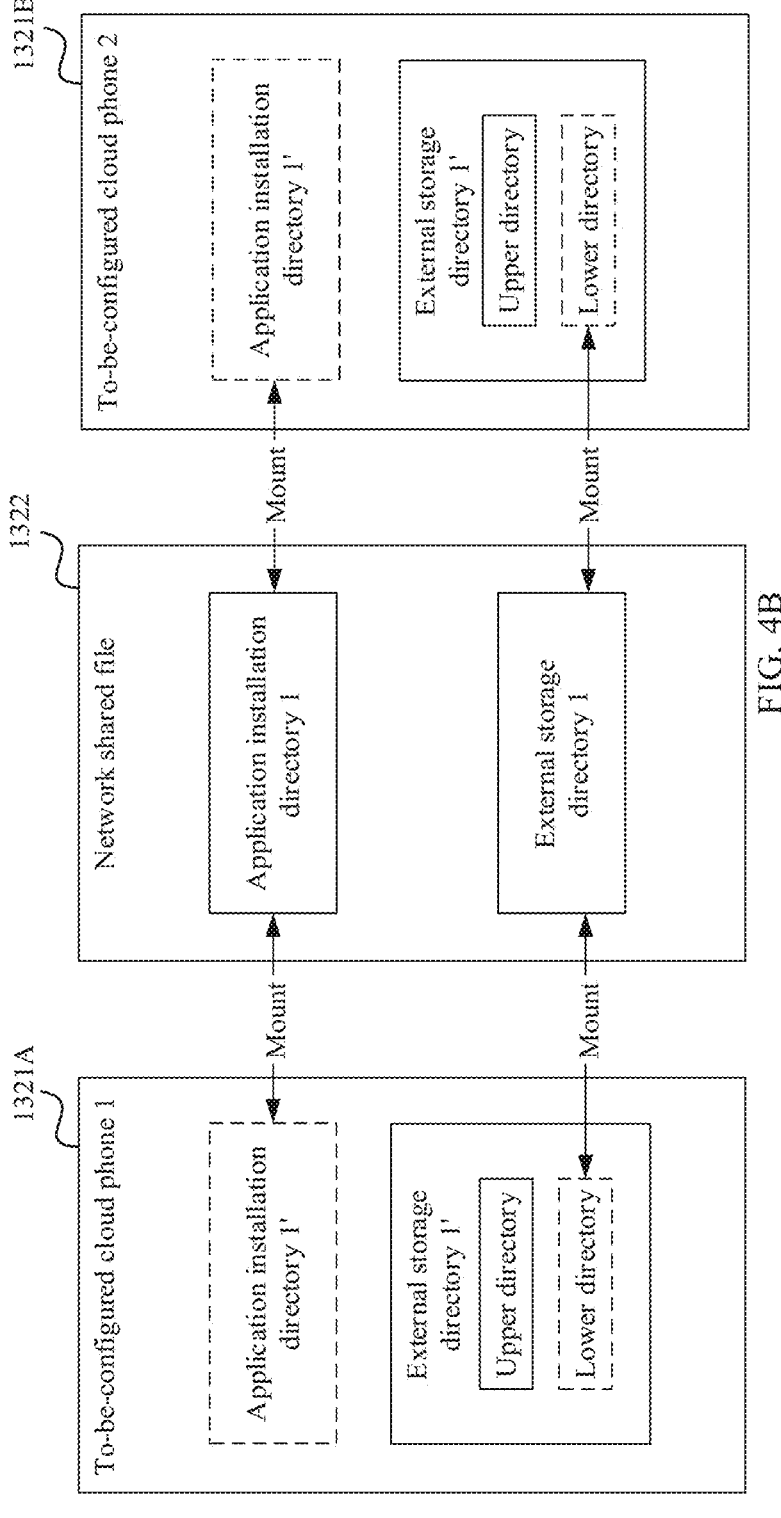

Similarly, as shown in FIG. 4B, when there are a plurality of to-be-configured cloud phones (FIG. 4B shows an example in which a same application is installed in two to-be-configured cloud phones), a to-be-configured cloud phone 1 and a to-be-configured cloud phone 2 may mount the installation information in the network shared file 1322, to install the application. The to-be-configured cloud phone 1 and the to-be-configured cloud phone 2 have respective first multi-layer file systems deployed, connect to the application installation directory 1 in the network shared file in a read-only manner, and then implement reading and writing of the external storage directory 1 by using the respective first multi-layer file systems, to install the application. An upper-layer directory of the first multi-layer file system is configured to store respective modified data generated during running of the application, and a lower-layer directory is connected to the application installation directory 1 in the network shared file in a read-only manner. It should be understood that for content not described in FIG. 4B, refer to the embodiment in FIG. 4A. Details are not described herein again. In addition, the foregoing example is used for description, and a quantity of to-be-configured cloud phones and a quantity of applications are not limited in this disclosure.

During implementation, the first multi-layer file system may be implemented by using an overlay file system, and the read-only manner may be as follows: the first installation directory in the network shared file is mapped to the to-be-configured cloud phone in a soft connection manner, so that when requesting to access the first installation directory, the to-be-configured cloud phone jumps, by using a network, to the first installation directory stored in the network shared file. In this way, installation information under the application installation directory is obtained from the network shared file in a read-only manner through mounting.

It may be understood that, in the foregoing method in which the network shared file is mounted by using the first multi-layer file system and the read-only manner, not only data reading and writing during running of the app can be ensured, so that the app can be started and run in the to-be-configured cloud phone, but also the app can be updated by remounting new-version installation information. After new-version installation information of an application cation A is installed in the template cloud phone and exported to the object storage device, the object storage device may synchronize the new-version installation information to a corresponding network shared file 1322 based on a previously recorded correspondence, the network shared file 1322 may provide a new mount directory for the to-be-configured cloud phone 1321 (certainly, a mount directory may remain unchanged, but only installation information under the mount directory is updated), and the to-be-configured cloud phone 1321 may remount the new-version installation information in the network shared file 1322 based on the new mount directory, to update the app.

During implementation, when remounting the new-version installation information, the to-be-configured cloud phone 1321 may remount the first installation directory in a read-only manner to implement a read operation on the first installation directory, and access an updated first multi-layer file system to implement a read/write operation on the second installation directory, to start and run an updated app. The updated first multi-layer file system recombines an updated upper-layer directory and an updated lower-layer directory. The updated lower-layer directory mounts an updated second installation directory in the network shared file 1322. The updated upper-layer directory uses a new preset directory (alternatively, an original preset directory is still used, but modified data under the directory is cleared), and modified data generated when the updated app is started and run may be written into the updated upper-layer directory, to start and run the updated app.

Similarly, in the foregoing method in which the file is mounted by using the first multi-layer file system and the read-only manner, not only the app can be started, run, and update in the to-be-configured cloud phone, but also the app can be quickly uninstalled. After the enterprise user initiates a request for uninstalling the app, the object storage device and the network shared file may delete the installation information corresponding to the app, to uninstall the app. In this manner in which the app is uninstalled, an application uninstallation step does not need to be performed in each cloud phone, thereby reducing resource scheduling pressure when the enterprise user manages the cloud phone, and improving app uninstallation efficiency of the cloud phone.

It may be understood that, in the foregoing manner in which the app is started, run, and updated by mounting the installation information in the network shared file, each cloud phone does not need to install the application in advance, which not only reduces internal memory occupation of the cloud phone, thereby improving efficiency of starting and running the app, but also reduces pressure of resource scheduling required for installing, updating, and uninstalling the application during cloud phone management of the enterprise user, thereby reducing operation costs.

2. Mounting of the installation information is implemented by deploying a second multi-layer file system in the network shared file.

In an embodiment, modified data generated by the to-be-configured cloud phone during running of the app may be sent to the network shared file, and the network shared file performs a read/write operation on the first installation directory and the second installation directory, so that pressure of the read/write operation is concentrated in the network shared file. This reduces processing pressure of the to-be-configured cloud phone during running of the app, and improves efficiency of running the app in the to-be-configured cloud phone, thereby improving user experience. The second multi-layer file system may be deployed in the network shared file, the second multi-layer file system may mount the installation information, the to-be-configured cloud phone may send modified data generated during running of the app to the network shared file, and the network shared file performs a read/write operation on the installation information by using the second multi-layer file system. During implementation, the second multi-layer file system may be implemented by using an overlay file system.

Figure 5A:
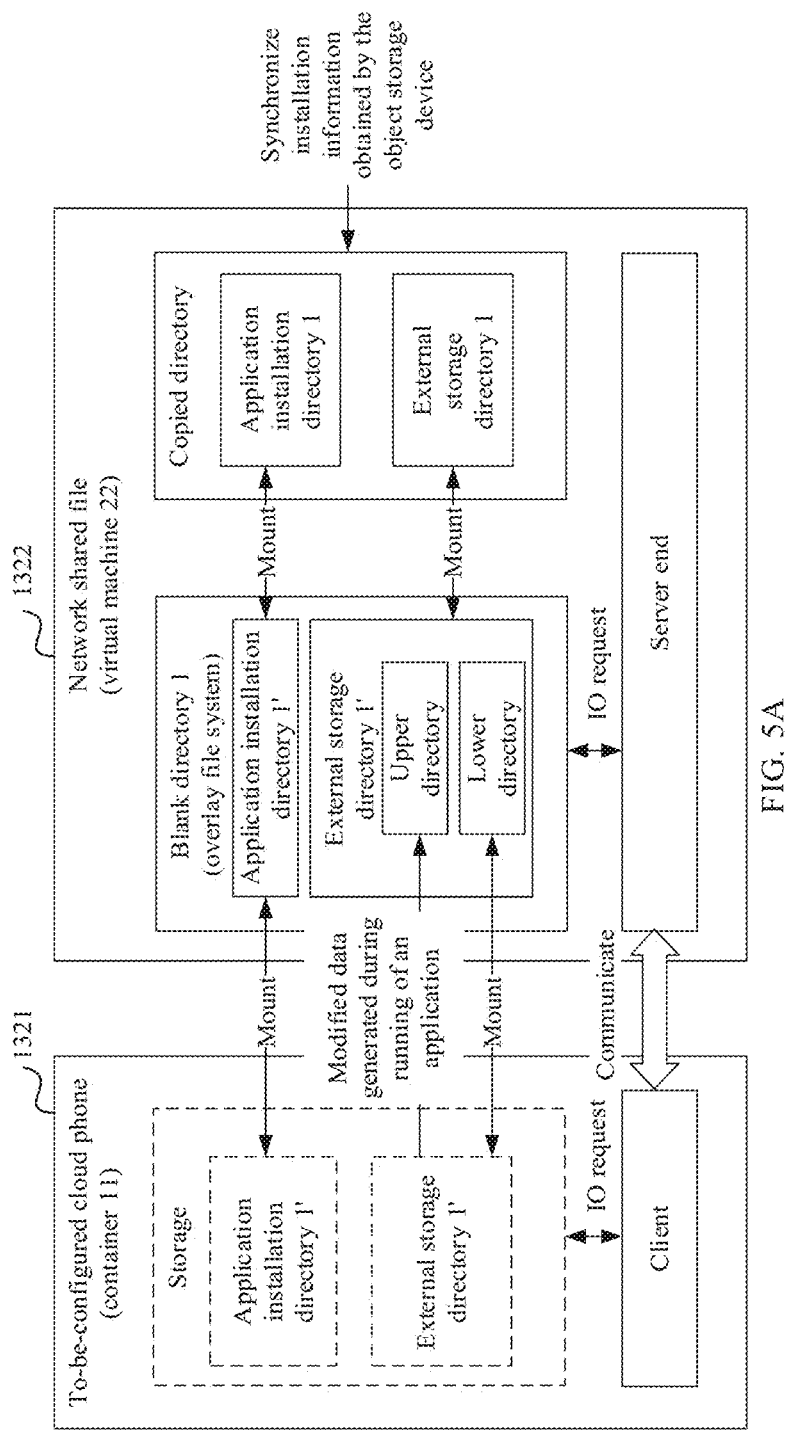
FIG. 5A and FIG. 5B are schematic diagrams of other structures in which a to-be-configured cloud phone mounts a network shared file according to this disclosure.

The foregoing example is still used. As shown in FIG. 5A, it is assumed that the operating system of the to-be-configured cloud phone is the ANDROID operating system, installation information of an app has been synchronized from the object storage device 1323 to the network shared file 1322, and in the installation information of the app, a first installation directory is an application installation directory 1, and a second installation directory is an external storage directory 1. Before the to-be-configured cloud phone starts the app, the network shared file 1322 may first create a blank directory 1 with the second multi-layer file system configured, which is mounted to the to-be-configured cloud phone as a root directory of a data disk of the to-be-configured cloud phone. Then, the network shared file 1322 creates a copied directory based on the installation information downloaded from the object storage device 1323. A directory structure and data in the copied directory are the same as a directory structure and data in the installation information, and the blank directory 1 is mounted to the copied directory. In this way, when the to-be-configured cloud phone runs the app, the to-be-configured cloud phone may read data from the blank directory 1 mounted to the copied directory, and write generated modified data into the blank directory 1 by using the second multi-layer file system of the blank directory 1. Similarly, when the app needs to be updated, the copied directory may be updated based on updated installation information, and then the blank directory is remounted to an updated copied directory. When the app needs to be uninstalled, the installation information and the copied directory may be directly deleted. It should be understood that when the blank directory is created, data in the directory is empty, and after the directory is mounted to the copied directory, the data in the blank directory is no longer empty. Based on this, mounting of the installation information is implemented by deploying the second multi-layer file system in the network shared file, so that the app can be started, run, updated, and uninstalled without installing the application in each cloud phone in advance, which not only reduces internal memory occupation of the cloud phone, thereby improving efficiency of starting and running the app, but also reduces pressure of resource scheduling required for installing, updating, and uninstalling the application during cloud phone management of the enterprise user, thereby reducing operation costs.

Figure 5B:
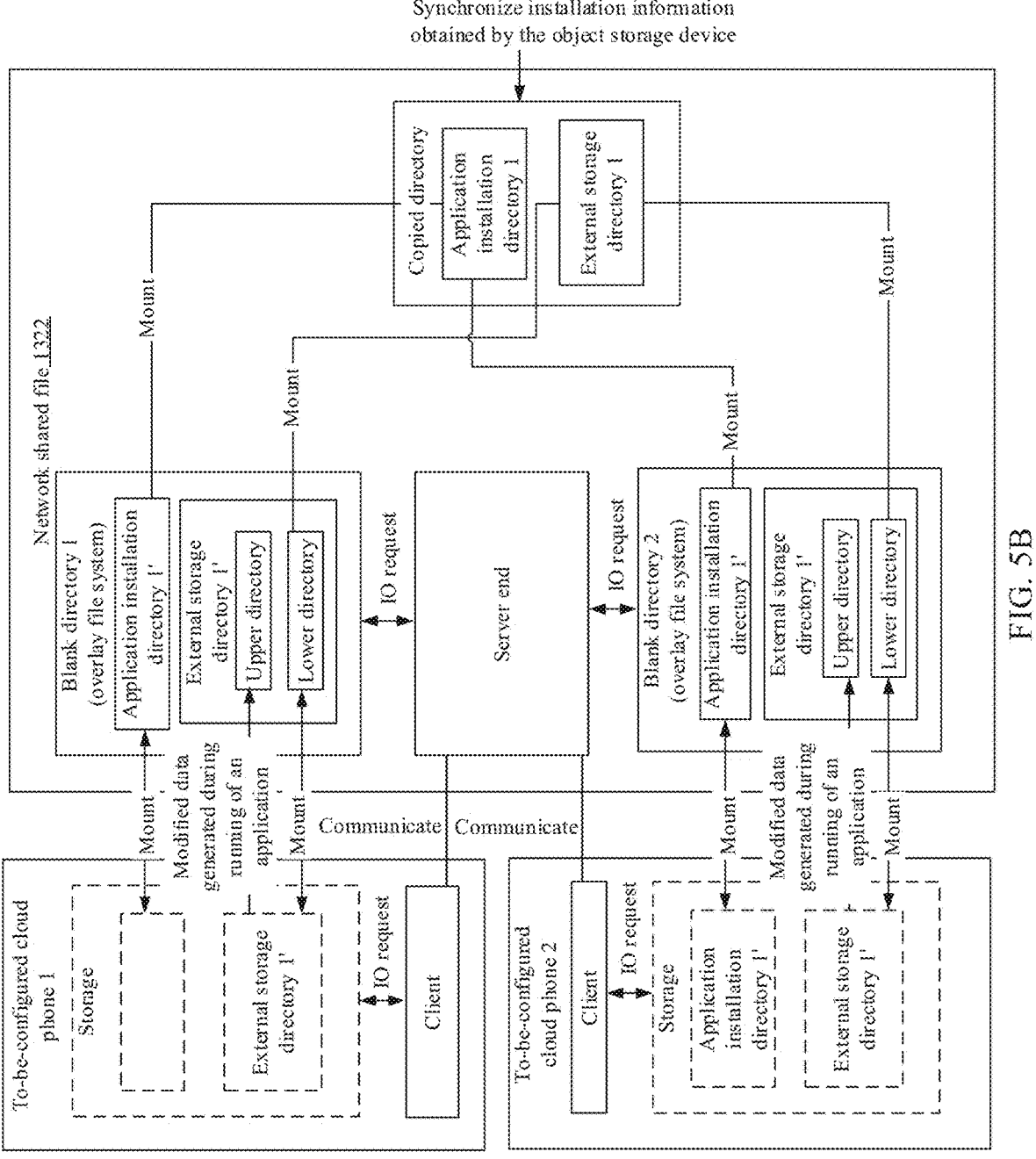

Similarly, as shown in FIG. 5B, when there are a plurality of to-be-configured cloud phones (FIG. 5B shows an example in which a same application is installed in two to-be-configured cloud phones), a to-be-configured cloud phone 1 and a to-be-configured cloud phone 2 may mount the network shared file 1322, to install the application. A plurality of second multi-layer file systems (a blank directory 1 and a blank directory 2 in FIG. 5B) are deployed in the network shared file 1322, respectively corresponding to different to-be-configured cloud phones, that is, the to-be-configured cloud phone 1 mounts the blank directory 1, and the to-be-configured cloud phone 2 mounts the blank directory 2, to implement installation in the to-be-configured cloud phone 1 and the to-be-configured cloud phone 2. It should be understood that for detailed content not described in FIG. 5B, refer to the embodiment in FIG. 5A. Details are not described herein again. In addition, the foregoing example is used for description, and a quantity of to-be-configured cloud phones and a quantity of applications are not limited in this disclosure.

During implementation, a server end may be deployed in the network shared file, and a client may be deployed in the to-be-configured cloud phone. The client is configured to send read/write IO requests (for example, a request for writing modified data generated during running of the app into the external storage directory, and a request for reading the application installation directory) generated by the to-be-configured cloud phone to the server end of the network shared file. The server end is configured to receive the read/write IO requests sent by the client, and send the read/write IO requests to the second multi-layer file system, so that the second multi-layer file system implements read/write operations on the installation information. In this way, the to-be-configured cloud phone remotely mounts the installation information, so that the app can be started, run, updated, and uninstalled without installing the application in each cloud phone in advance, which not only reduces internal memory occupation of the cloud phone, thereby improving efficiency of starting and running the app, but also reduces pressure of resource scheduling required for installing, updating, and uninstalling the application during cloud phone management of the enterprise user, thereby reducing operation costs.

It should be understood that, because one network shared file may be connected to a plurality of to-be-configured cloud phones, and each to-be-configured cloud phone sends a plurality of read/write IO requests to the network shared file, pressure on the network shared file is relatively high. Therefore, the IO requests in the to-be-configured cloud phone may be sent to the client, and the client sends received IO requests to the server end for processing after aggregating the requests, thereby reducing a quantity of IO requests received by the network shared file, reducing processing pressure of the network shared file, and improving efficiency of starting, running, updating, and uninstalling the app. During implementation, the network shared file may first cache a received IO request into an internal memory, and after receiving an IO request sent by the to-be-configured cloud phone, first update data in the cache, and then generate an asynchronous IO request. Then, IO requests for a large quantity of small files are aggregated into a single IO request, and aggregated IO data is sent to the server end at a time. The server end may parse received IO requests and then update the requests to a storage medium in batches.

In an embodiment, user data is further generated during running of the app. In the foregoing method for app management, the user data can still be retained after the application is updated, thereby improving user experience. The user data may be personal service data and personal habit data that are locally generated during running of the app. For example, when the app is a game app, for example, user data of a mobile game app may include default account information, historical login server ID information, and the like of the user, and user data of a standalone game app may include a game clearance record, game character data, and the like. When the app is an office app, for example, user data of a mailbox app may include mailbox account binding information, mailbox business card setting, and the like of the user, and user data of an office communication app may include a historical chat record of the user, historical account information of the user, historical file information of the user, service data, and the like. It should be understood that the user data may further include private data generated by the user during running of other types of apps, which are not illustrated herein one by one.

It should be understood that, because all data generated during running of the app is stored in the network shared file, when the app is updated, after an updated copied directory is generated based on updated installation information, the user data can still be stored in the blank directory of the network shared file. In this way, after the app is updated, the user data can still be retained, and the user does not need to reset account information, nor needs to re-download service data or the like, thereby improving user experience.

In an embodiment, due to a physical delay, the cloud phone used by the user is a cloud phone in a public cloud of a geographic region in which the user is located. For example, if the user is currently located in North China, the cloud phone used by the user and the network shared file belong to a North China data center. If the user is currently located in South China, the cloud phone used by the user and the network shared file belong to a South China data center. Generally, data cannot be communicated between data centers, or data communication requires high fees. In this disclosure scenario, in the foregoing method for app management, when a geographical location of the user changes, the user data can be quickly synchronized from a historical network shared file to a current network shared file, thereby avoiding user data loss caused by the geographical location change of the user, reducing maintenance costs, and improving user experience.

Figure 6:
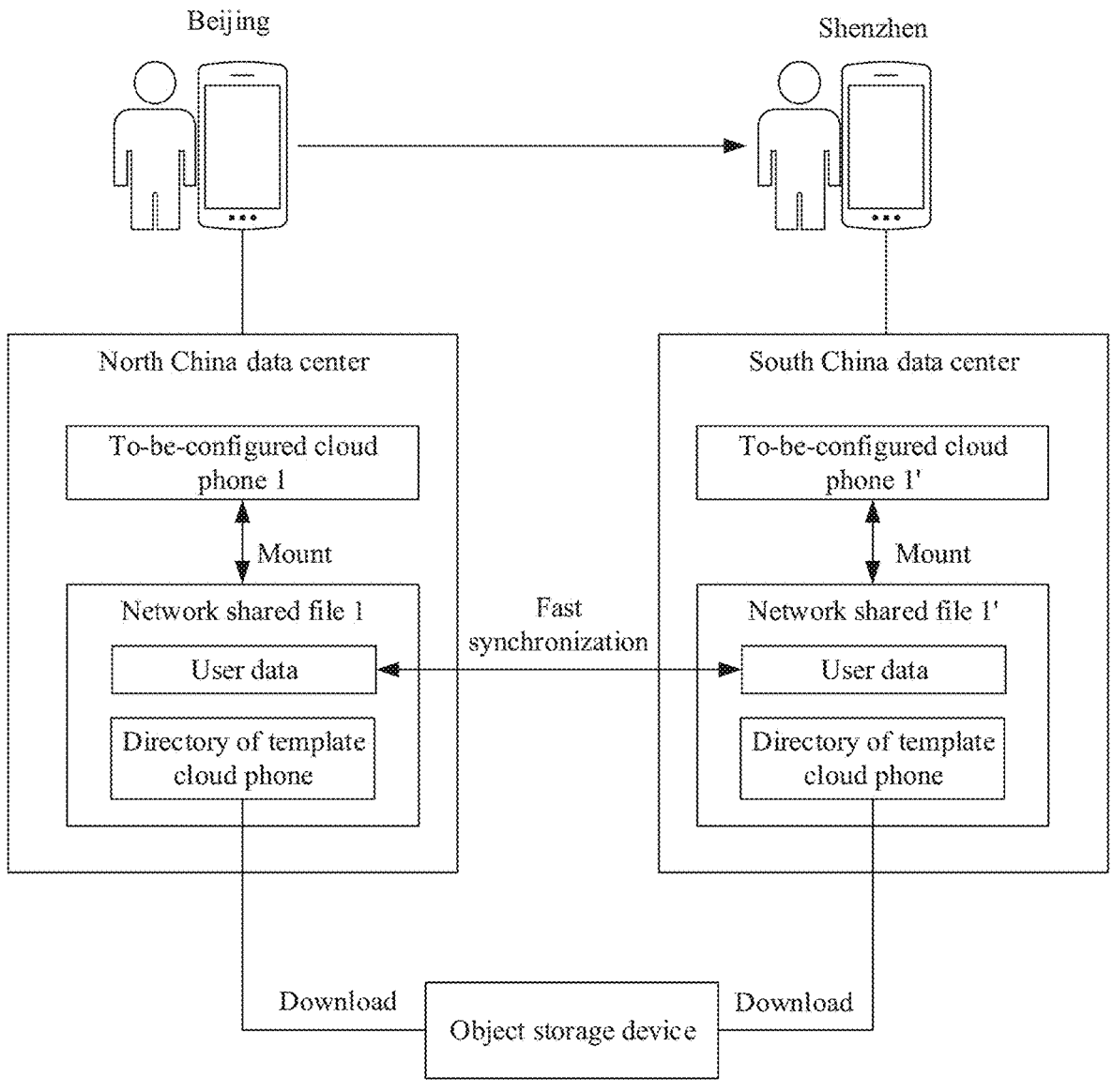
FIG. 6 is a schematic flowchart of migration of a to-be-configured cloud phone across data centers according to this disclosure.

For example, as shown in FIG. 6, it is assumed that when a user A works in Beijing (North China), the user A runs an office app by using a cloud phone 1 and a network shared file 1 in the North China data center, and then the user A travels to work in Shenzhen (South China). In this case, the object storage device may send a request for creating a network shared file 1' to the South China data center, and then synchronize installation information of the office app to the network shared file 1', and the network shared file 1 quickly synchronizes user data generated when the user A works in Beijing to the network shared file 1', so that a cloud phone 1' mounting the network shared file 1' runs the app, while the user data is retained. The user does not need to reenter an account password or re-download service data or the like, thereby improving user experience.

In an embodiment, for the cloud phone currently used by the user, cloud phone resource migration occurs from time to time due to a plurality of reasons. In the foregoing method for app management, a time required for cloud phone resource migration can be reduced, while it can be ensured that user data is not lost after the cloud phone resource migration, thereby improving user experience. The cloud phone resource migration means that the cloud phone currently used by the user migrates from one server to another server. There are various reasons for resource migration. For example, a resource usage rate of a server in which the cloud phone currently used by the user is located is high. To avoid stalling of the cloud phone, the cloud phone currently used by the user may migrate to another server with a lower resource usage rate. Alternatively, the user has a different use requirement when using the cloud phone. For example, the user has installed only an office app before, and configuration of the cloud phone is relatively low. If the user installs a game app with a high configuration requirement, the cloud phone used by the user may also migrate from one server to another server. It should be understood that the foregoing reasons for resource migration are used for illustration, and this disclosure sets no limitation thereto. In this disclosure scenario of cloud phone resource migration, in the foregoing method for app management, when resource migration occurs on the cloud phone used by the user, the cloud phone before migration may be stopped first, and the cloud phone after migration may remount the network shared file, to quickly implement cloud phone resource migration. Because the entire migration process is based on mounting of the network shared file, a redundant step such as application installation or data synchronization in the cloud phone after migration is not required, which shortens cloud phone resource migration to seconds, thereby improving user experience. In addition, because the cloud phone after migration and the cloud phone before migration mount the same network shared file, the user data can still be retained after the cloud phone resource migration, and the user does not need to reenter an account password or re-download service data or the like, thereby further improving user experience.

For example, as shown in FIG. 7, assuming that a cloud phone 2 used by a user migrates from a server 1 to a server 2, running of the cloud phone 2 may be stopped first, then mounting between the cloud phone 2 and the network shared file is canceled, then a cloud phone 2' is created in the server 2, the mount directory in the network shared file is provided to the cloud phone 2', and the cloud phone 2' is mounted to the network shared file by using the mount directory, to implement fast cloud phone resource migration, thereby improving user experience.

It should be understood that, this disclosure provides two methods for the to-be-configured cloud phone to start, run, update, and uninstall the application by mounting the network shared file, that is, file mounting is implemented by deploying the first multi-layer file system in the to-be-configured cloud phone, and mounting of the installation information is implemented by deploying the second multi-layer file system in the network shared file. The foregoing two methods are used for illustration. During implementation, file mounting may alternatively be implemented by using another method. This is not limited in this disclosure.

It should be noted that, in the application installation method provided in this disclosure, after a user purchases a cloud phone service and installs an application in a template cloud phone, the cloud platform may automatically perform steps S310 to S340 to install the application in at least one to-be-configured cloud phone for the user, or the cloud platform may implement, based on a configuration requirement input by the user, the solution provided in this disclosure. During implementation, the user may manually set an object storage device, a network shared file, a to-be-configured cloud phone, and the like by using a console or an API. As shown in FIG. 8, the following explains how the cloud platform implements application installation of a to-be-configured cloud phone based on a user input in the method provided in this disclosure.

S410: The cloud platform 131 provides a cloud phone configuration interface for a user, where the cloud phone configuration interface is configured to configure a template cloud phone based on a first input of the user, a plurality of applications are set in the template cloud phone, and a directory of the template cloud phone records installation information of the plurality of applications.

The first input of the user may include an installation package of an app that needs to be installed for the user, an update package, performance configuration information of the template cloud phone, and the like. The cloud phone configuration interface may be a console or an API of the cloud platform 131. The console may be an application program or a web page for the user to purchase a cloud service and configuring the cloud service. For example, the user may purchase the template cloud phone on a website of the cloud platform, and upload an application that needs to be installed and update the application in the template cloud phone. It should be understood that the foregoing example is used for description, and this disclosure does not set a limitation thereto.

S420: The cloud platform 131 provides a network shared file configuration interface for the user, where the network shared file configuration interface is configured to store the directory of the template cloud phone into a network shared file based on a second input of the user.

During implementation, before the providing a network shared file configuration interface, the method further includes: providing an object storage interface, where the object storage interface is configured to obtain the directory of the template cloud phone and store the directory of the template cloud phone into an object storage device based on a fourth input of the user, and the network shared file configuration interface is configured to synchronize storage of the directory, stored in the object storage device, of the template cloud phone to the network shared file based on the second input of the user. Herein, the fourth input of the user may be an instruction for synchronizing the network shared file with the object storage device. The cloud platform may receive the fourth input of the user, obtain the directory of the template cloud phone, and store the directory of the template cloud phone into the object storage device. The second input of the user may be an instruction of associating the object storage device with the network shared file. For example, in the embodiment in FIG. 2, the object storage device is associated with a network shared file 1 and a network shared file 2. Each network shared file stores installation information of two applications. It should be understood that the foregoing example is used for description, and this disclosure does not set a limitation thereto. In addition, the network shared file configuration interface and the object storage interface may be the console or the API, and this is not limited in this disclosure.

Optionally, before the providing an object storage interface, the method further includes the following step: providing an object storage creation interface, where the object storage creation interface is configured to create the object storage device based on a seventh input of the user. The seventh input may be an instruction for creating the object storage device and configuration information for the object storage device, such as a storage capacity of the object storage device or a storage directory of the object storage device.

For example, the cloud platform 131 provides the object storage device creation interface for the user. Assuming that the interface is an API interface, the user may create an object storage device by using an API instruction. For example, an OBS data bucket in the cloud service is used as an object storage device, to store the directory of the template cloud phone. For example, the API instruction (fifth input of the user) of creating the object storage device may be as follows:

```
POST /share-stores/
{"bucket_id":"..."}
```

In this way, the object storage device is created, and then the directory of the template cloud phone may be packed and compressed (for example, compressed in tar.gz), and uploaded to the OBS data bucket.

Figure 9:
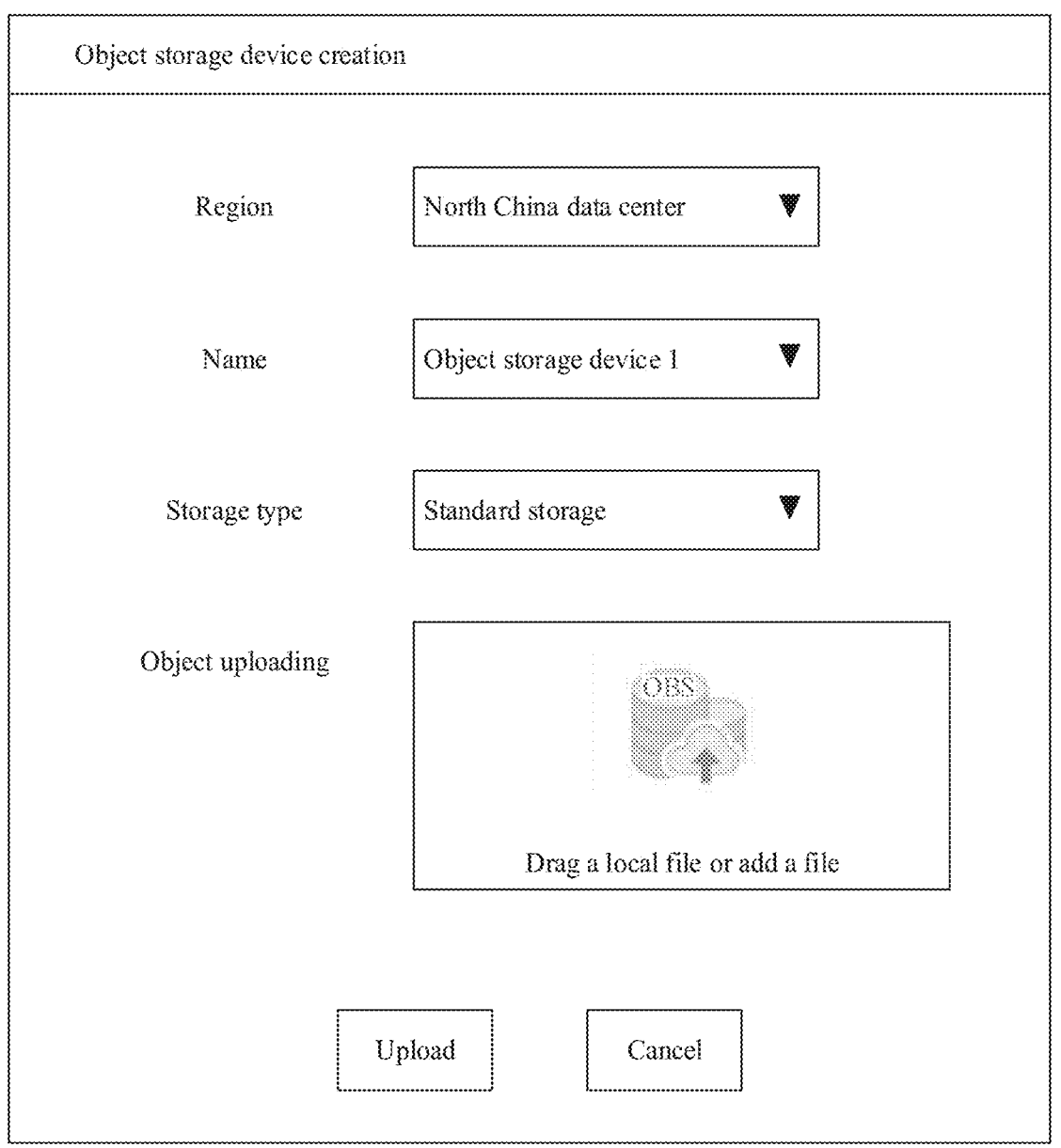
FIG. 9 is a schematic diagram of a console interface according to this disclosure.

Similarly, if the interface is a console in a form of a web page or an application program, for example, as shown in FIG. 9, the console may present some configuration options for creating an object storage device to the user. For example, a North China data center is selected as a data center in which the object storage device is located, an object storage device 1 is selected as a name of the object storage device, standard storage is selected as a storage type of the object storage device. The user may drag a local file to an "upload object" column for storage, or click an icon to add a file, to import the directory of the template cloud phone into the object storage device, and finally click an "upload" button to complete creation of the object storage device 1 and storage of the directory of the template cloud phone. Configuration content shown in FIG. 9 may be the fifth input and the seventh input of the user. It should be understood that the console interface shown in FIG. 9 is used for illustration, and this disclosure sets no limitation thereto.

Optionally, before the providing a network shared file configuration interface, the method provided in this disclosure further includes: providing a network shared file creation interface, where the network shared file creation interface is configured to create the network shared file based on a sixth input of the user. The sixth input may be an instruction for creating the network shared file and configuration information for the network shared file, such as a storage capacity of the network shared file or a type of a file system. This is not limited in this disclosure.

For example, the cloud platform 131 provides the network shared file creation interface for the user. Assuming that the interface is an API interface, the user may create a network shared file, for example, an instance of an SFS service in the cloud service, by using an API instruction, and then synchronize the directory of the template cloud phone in the OBS data bucket to the SFS instance. For example, the API instruction (sixth input of the user) of creating the network shared file may be as follows:

```
POST /share-stores/{share_store_id}/instances
{ "available_zone": "...", "name": "..." }
```

It should be understood that the SFS instance created by using the API may automatically synchronize the directory, stored in the object storage device, of the template cloud phone. The API instruction is used for illustration, and is not limited in this disclosure.

Similarly, if the interface is a console in a form of a web page or an application program, for example, as shown in FIG. 10, the console may present some configuration options for creating a network shared file to the user. For example, a North China data center is configured as a data center in which the network shared file is located, a network shared file 1 is set as a name of the network shared file, an NFS protocol is configured as a protocol type, a capacity of the network shared file 1 is 500 GB, and the network shared file 1 synchronizes data in the object storage device 1 shown in FIG. 9, that is, the directory of the template cloud phone. Finally, a "create" button is clicked to complete creation of the network shared file and data synchronization with the object storage device. Configuration content shown in FIG. 10 may be the sixth input, the second input, and the fourth input of the user. It should be understood that the console interface shown in FIG. 10 is used for illustration, and this disclosure sets no limitation thereto.

In an embodiment, the cloud phone configuration interface is further configured to configure, based on a third input of the user, at least one to-be-configured cloud phone to mount the network shared file, to complete installation of the plurality of applications. For example, assuming that the cloud phone configuration interface is an API interface, the user may configure a to-be-configured cloud phone by using an API instruction, so that the to-be-configured cloud phone mounts the SFS instance created in the foregoing example. For example, the API instruction (third input of the user) may be as follows:

```
POST /share-stores/{share_store_id}/instances/{id}/action
{ "mount": { "target" : "/data/share_app_center"} }
```

From a perspective of the system, the user may further input an API instruction to view mounting information, which is displayed as follows:

```
# mount
{nfs export address}:/ on /data/share_app_center type nfs (ro,vers=3,...)
```

It should be understood that the API instruction is used for illustration, and is not limited in this disclosure.

It can be learned with reference to the embodiments in FIG. 2 to FIG. 7 that, two mounting manners are provided in this disclosure for the at least one to-be-configured cloud phone to mount the network shared file, to complete installation of the plurality of applications. The following separately describes the two mounting manners.

In an embodiment, a first multi-layer file system may be deployed in the to-be-configured cloud phone, which connects to static data in a read-only manner, and performs a read/write operation on dynamic data by using the multi-layer file system. In this way, the directory of the template cloud phone is mounted, to complete installation, starting, and running of the application.

one to-be-configured cloud phone to perform a read/write operation on the second installation directory, the first multi-layer file system includes an upper-layer directory and a lower-layer directory, the lower-layer directory is configured to connect to the second installation directory in a read-only mapping manner, the upper-layer directory is configured to store modified data generated during running of an application installed in the at least one to-be-configured cloud phone, and the first multi-layer file system is configured to overlay the upper-layer directory and the lower-layer directory. For descriptions of deploying the first multi-layer file system in the to-be-configured cloud phone to implement mounting, refer to the foregoing embodiments in FIG. 4A and FIG. 4B. Details are not described herein again.

It should be understood that, in the method of deploying the first multi-layer file system in the cloud phone to implement application mounting, the third input may include an instruction for connecting the to-be-configured cloud phone to the first installation directory in the first network shared file in a read-only manner, an instruction for setting the first multi-layer file system in the to-be-configured cloud phone, and an instruction for storing modified data into the upper-layer directory in the first multi-layer file system, and performing a soft connection between the lower-layer directory and the second installation directory. For example, assuming that the cloud phone configuration interface is an API interface, the user may configure a to-be-configured cloud phone by using an API instruction, so that the to-be-configured cloud phone mounts the SFS instance created in the foregoing example. For example, the API instruction for connecting the to-be-configured cloud phone to the first installation directory in the first network shared file in a read-only manner may be as follows:

```
# cd /data/app/
# ln -s /data/share_app_center/{app_id}/app/{app_package} /data/app/{app_package}
```

During implementation, the cloud phone configuration interface is further configured to configure, based on the third input of the user, the at least one to-be-configured cloud phone to connect to the first installation directory in the first network shared file in a read-only manner. The cloud phone configuration interface is further configured to configure a first multi-layer file system in the at least one to-be-configured cloud phone based on the third input of the user, where the first multi-layer file system is configured for the at least The user may execute is to view a connection relationship between the to-be-configured cloud phone and the first installation directory, which is displayed as follows:

```
#ls -1
drwxr-xr-x 1 system system 4096 2020-05-25 17:51 {app_package} -> /data/
share_app_center /{app_id}/app/{app _package}
```

The API instruction for deploying the first multi-layer file system in the to-be-configured cloud phone, where the upper-layer directory of the first multi-layer file system stores modified data, and a soft connection is performed between the lower-layer directory and the second installation directory may be as follows:

```
# mount -t overlay -o
lowerdir=/sfs_dir/{app_id}/sdcard/{app_package},upperdir=/overlay/{app_package}/
diff/,workdir=/overlay/{app_package}/work/ /overlay/{app_package}/merge/
# mount --bind /overlay/{app_package}/merge/ /sdcard/Android/data/{app_package}
```

As set in the instruction, the second installation directory is configured as the lower-layer directory (that is, lowerdir in the instruction) to connect to the to-be-configured cloud phone in a read-only manner, and the upper-layer directory (that is, upperdir in the instruction) is configured to store modified data. The first multi-layer file system overlays the upper-layer and lower-layer directories, to complete application installation of the to-be-configured cloud phone. It should be understood that the API instruction is used for illustration, and is not limited in this disclosure.

Optionally, the user may further register an application for which mounting is completed with an operating system of the to-be-configured cloud phone by using an API instruction, so that an application icon is displayed in the to-be-configured cloud phone, and the user may click the icon to start the application. The API instruction of registering the application with the operating system of the to-be-configured cloud phone may be as follows: "# bash quick-reg.sh/data/app/{app_package}". It should be understood that the API instruction is used for illustration, and is not limited in this disclosure.

In an embodiment, when an application is updated, the cloud platform may receive an instruction that is input by the user by using the console or the API, to implement application update. The user may first update the application in the template cloud phone, to generate an updated directory of the template cloud phone, which is then compressed, packed, and uploaded to the object storage device. The object storage device synchronizes the updated directory of the template cloud phone to the network shared file. The to-be-configured cloud phone remounts the network shared file, so that the application can be updated. For example, an API instruction for the to-be-configured cloud phone to remount the first installation directory in a read-only manner may be as follows:

```
# rm /data/app/{app_package}
# cd /data/app/
#ln-s
/data/share_app_center/{app_id}/{version}/app/{app_package}/data/app/{app_package}
```

An API instruction for the to-be-configured cloud phone to remount the second installation directory by using the first multi-layer file system may be as follows:

```
# umount /sdcard/Android/data/{app_package}
#mount-toverlay-o
lowerdir=/sfs_dir/{app_id}/{version}/sdcard/{app_package},upperdir
=/overlay/{app_package}/diff/,workdir=/overlay/{app_package}/work//overlay/{app_package}/
merge/
# mount --bind /overlay/{app_package}/merge/ /sdcard/Android/data/{app_package}
```

In this way, application update is completed. In the entire update process, only a new-version application needs to be installed in the template cloud phone, and the application does not need to be updated in each cloud phone purchased by the user, so that application update efficiency is improved, thereby improving user experience.

In an embodiment, alternatively, a second multi-layer file system may be deployed in the network shared file, which connects to static data in a read-only manner, and performs a read/write operation on dynamic data by using the multi-layer file system. In this way, the directory of the template cloud phone is mounted, to complete installation, starting, and running of the application.

During implementation, the network shared file configuration interface is further configured to configure, based on the third input of the user, the first network shared file to connect to the first installation directory in the first network shared file in a read-only manner. The network shared file configuration interface is further configured to configure a second multi-layer file system in the first network shared file based on the third input of the user, where the second multi-layer file system is configured to receive and process a data read/write request sent by the at least one to-be-configured cloud phone, the second multi-layer file system includes an upper-layer directory and a lower-layer directory, the lower-layer directory is configured to connect to the second installation directory in a read-only mapping manner, the upper-layer directory is configured to store modified data generated during running of an application installed in the first network shared file, and the second multi-layer file system is configured to overlay the upper-layer directory and the lower-layer directory.

It can be learned with reference to the embodiments in FIG. 5A and FIG. 5B that, before the to-be-configured cloud phone starts the app, a blank directory 1 with the second multi-layer file system configured may be first created in the network shared file, and is mounted to the to-be-configured cloud phone as a root directory of a data disk of the to-be-configured cloud phone. Then, a copied directory is created based on the installation information downloaded from the object storage device. A directory structure and data in the copied directory are the same as a directory structure and data in the installation information, and the blank directory 1 is mounted to the copied directory. In this way, when the to-be-configured cloud phone runs the app, the to-be-configured cloud phone may read data from the blank directory 1 mounted to the copied directory, and write generated modified data into the blank directory 1 by using the second multi-layer file system of the blank directory 1. For example, when the network shared file configuration interface is an API interface, assuming that the to-be-configured cloud phone is C1, an API instruction for creating a blank directory for the to-be-configured cloud phone as a root directory may be as follows:

```
POST /share-stores/{share_store_id}/instances/{id}/action
{ "create":{ "path" : "/data_C1" } }
```

An API for mounting the blank directory to the to-be-configured cloud phone C1 as a root directory of a data disk of the to-be-configured cloud phone C1 may be as follows:

```
POST /share-stores/{share_store_id}/instances/{id}/action
{ "mount": { "path" : "/data_C1", "target": "/data" } }
```

The following API instruction may be input to view mounting information, which is displayed as follows:

```
# mount
{cpsfs address}:/data_C1 on /data type cpsfs (rw,ver=1,...)
```

An API for creating a copied directory in the network shared file and mounting the copied directory to the root directory of the to-be-configured cloud phone C1 may be as follows:

```
POST /share-stores/{share_store_id}/instances/{id}/action
{ "copy_on_write": { "src_path" : "/App_A_share/sdcard/App_A", "dest_path" :
"/data_C1/sdcard/Android/data/App_A"} }
```

Based on this, the to-be-configured cloud phone C1 may mount the network shared file, to install, run, and update the application. It should be understood that the foregoing example is used for description, and this disclosure does not set a limitation thereto. In addition, the method of implementing application update by using the second multi-layer file system by the network shared file is similar to the method of implementing application update by using the first multi-layer file system by the to-be-configured cloud phone. An API for application update is not repeatedly illustrated herein.

In an embodiment, if resource migration occurs on a to-be-configured cloud phone, that is, the template cloud phone, the at least one to-be-configured cloud phone, and the first network shared file are located in a first data center, and when a first to-be-configured cloud phone in the at least one to-be-configured cloud phone migrates from the first data center to a second data center, the network shared file configuration interface is further configured to create, based on a fifth input of the user, a second network shared file located in the second data center, where the second network shared file is a mirror of the first network shared file. The network shared file configuration interface is further configured to configure, based on a sixth input of the user, the first to-be-configured cloud phone migrating to the first data center to mount the second network shared file, to complete installation of the plurality of applications. Simply, after a location changes, the user may create the second network shared file of the second data center by using the API or the console, and the to-be-configured cloud phone after migration mounts the second network shared file, so that user data is not lost when the geographic location of the user changes, thereby improving user experience. For details of the foregoing process, refer to the embodiment in FIG. 6. Details are not described herein again.

In an embodiment, when a to-be-configured cloud phone migrates from a first server in the first data center to a second server in the first data center, the network shared file configuration interface is configured to configure the to-be-configured cloud phone in the second server to mount the network shared file, to complete installation of the plurality of applications. Therefore, a migration time of the to-be-configured cloud phone in the same data center is shortened to seconds, thereby improving user experience of the cloud phone. For details of the foregoing process, refer to the embodiment in FIG. 7. Details are not described herein again.

In an embodiment, the user may further upload, by using the console or the API, a list of applications that need to be installed and a quantity x of to-be-configured cloud phones. The cloud platform automatically creates a template cloud phone, a network shared file, and an object storage device based on the application quantity and the application list that are uploaded by the user, installs, in the template cloud phone, the applications in the application list, and then exports a directory of the template cloud phone to the object storage device. Installation information in the object storage device is synchronized to the network shared file, and x−1 cloud phones are configured to mount the network shared file. In this way, the applications in the application list are installed in the x−1 cloud phones. With the template cloud phone counted, the applications in the application list are installed in x cloud phones. A user operation in the entire cloud phone application installation is very convenient, thereby improving user experience.

In conclusion, in the cloud-phone-based application installation method provided in this disclosure, an application does not need to be installed in each cloud phone, but instead, installation information of the application is synchronized to the network shared file, and the cloud phone may mount installation information of each application from the network shared file, so that the application can be started, run, and updated without installing the application in advance. This reduces internal memory occupation of the cloud phone, and greatly reduces operation and maintenance costs of the cloud phone. In addition, the app can be started, run, and updated faster, thereby improving user experience.

The method in embodiments of this disclosure is described in detail above. To better implement the foregoing solution in embodiments of this disclosure, correspondingly, the following further provides a related device configured to cooperate to implement the foregoing solution.

Figure 11:
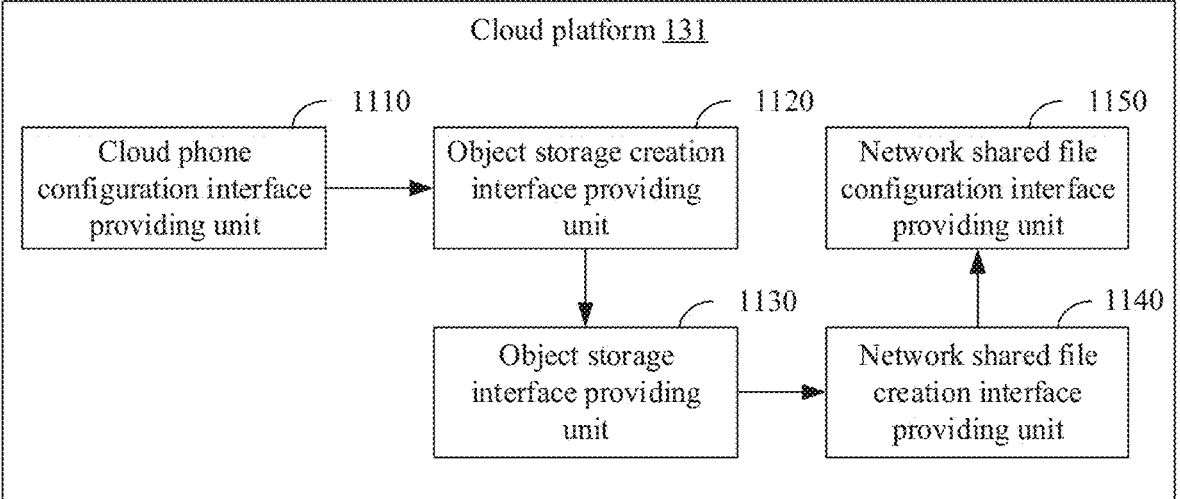
FIG. 11 is a schematic diagram of a structure of a cloud platform according to this disclosure.

As shown in FIG. 11, this disclosure provides a cloud platform 131, including a cloud phone configuration interface providing unit 1110, an object storage creation interface providing unit 1120, an object storage interface providing unit 1130, a network shared file creation interface providing unit 1140, and a network shared file configuration interface providing unit 1150.

The cloud phone configuration interface providing unit 1110 is configured to provide a cloud phone configuration interface, where the cloud phone configuration interface is configured to configure a template cloud phone based on a first input of a user, a plurality of applications are set in the template cloud phone, and a directory of the template cloud phone records installation information of the plurality of applications. The network shared file configuration interface providing unit 1150 is configured to provide a network shared file configuration interface, where the network shared file configuration interface is configured to store the directory of the template cloud phone into a first network shared file based on a second input of the user. The cloud phone configuration interface is further configured to configure, based on a third input of the user, at least one to-beconfigured cloud phone to mount the first network shared file, to complete installation of the plurality of applications.

In an embodiment, the object storage interface providing unit 1130 is configured to provide an object storage interface, where the object storage interface is configured to obtain the directory of the template cloud phone and store the directory of the template cloud phone into an object storage device based on a fourth input of the user. The network shared file configuration interface is configured to synchronize storage of the directory, stored in the object storage device, of the template cloud phone to the first network shared file based on the second input of the user.

In an embodiment, the first network shared file includes a first installation directory and a second installation directory, the second installation directory includes dynamic data of the plurality of applications, and the first installation directory includes static data of the plurality of applications. The cloud phone configuration interface is further configured to configure, based on the third input of the user, the at least one to-be-configured cloud phone to connect to the first installation directory in the first network shared file in a read-only manner. The cloud phone configuration interface is further configured to configure a first multi-layer file system in the at least one to-be-configured cloud phone based on the third input of the user, where the first multi-layer file system is configured for the at least one to-be-configured cloud phone to perform a read/write operation on the second installation directory, the first multi-layer file system includes an upper-layer directory and a lower-layer directory, the lower-layer directory is configured to connect to the second installation directory in a read-only mapping manner, the upper-layer directory is configured to store modified data generated during running of an application installed in the at least one to-be-configured cloud phone, and the first multi-layer file system is configured to overlay the upper-layer directory and the lower-layer directory.

In an embodiment, the network shared file includes a first installation directory and a second installation directory, the second installation directory includes dynamic data of the plurality of applications, and the first installation directory includes static data of the plurality of applications. The network shared file configuration interface is further configured to configure, based on the third input of the user, the first network shared file to connect to the first installation directory in the first network shared file in a read-only manner. The network shared file configuration interface is further configured to configure a second multi-layer file system in the first network shared file based on the third input of the user, where the second multi-layer file system is configured to receive and process a data read/write request sent by the at least one to-be-configured cloud phone, the second multi-layer file system includes an upper-layer directory and a lower-layer directory, the lower-layer directory is configured to connect to the second installation directory in a read-only mapping manner, the upper-layer directory is configured to store modified data generated during running of an application installed in the first network shared file, and the second multi-layer file system is configured to overlay the upper-layer directory and the lower-layer directory.

In an embodiment, the first network shared file is located in a first data center, and when a first to-be-configured cloud phone is located in a second data center, the network shared file configuration interface is further configured to create, based on a fifth input of the user, a second network shared file located in the second data center, where the second network shared file is a mirror of the first network shared file.

In an embodiment, when a to-be-configured cloud phone migrates from a first server in the first data center to a second server in the first data center, the network shared file configuration interface is configured to configure the to-be-configured cloud phone in the second server to mount the network shared file, to complete installation of the plurality of applications.

In an embodiment, the network shared file creation interface providing unit 1140 is configured to provide a network shared file creation interface, where the network shared file creation interface is configured to create the network shared file based on a sixth input of the user.

In an embodiment, the object storage creation interface providing unit 1120 is configured to provide an object storage creation interface, where the object storage creation interface is configured to create the object storage device based on a seventh input of the user.

In conclusion, when the cloud platform provided in this disclosure installs an application for a cloud phone, the application does not need to be installed in each cloud phone, but instead, installation information of the application is synchronized to the network shared file, and the cloud phone may mount installation information of each application from the network shared file, so that the application can be started, run, and updated without installing the application in advance. This reduces internal memory occupation of the app in the cloud phone, and greatly reduces operation and maintenance costs of the cloud phone. In addition, the app can be started, run, and updated faster, thereby improving user experience.

Figure 12:
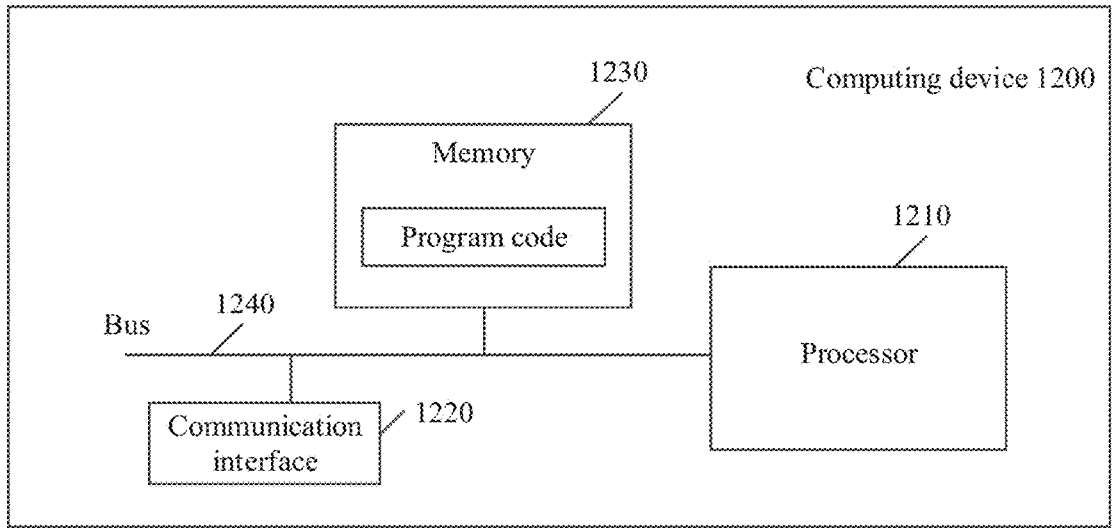
FIG. 12 is a schematic diagram of a structure of a computing device according to this disclosure.

FIG. 12 is a schematic diagram of a structure of a computing device 1200 according to an embodiment of this disclosure. The computing device 1200 may be the cloud platform 131 in the embodiments in FIG. 1A and FIG. 1B to FIG. 11. As shown in FIG. 12, the computing device 1200 includes a processor 1210, a communication interface 1220, and a memory 1230. The processor 1210, the communication interface 1220, and the memory 1230 may be connected to each other by using an internal bus 1240, or may implement communication by another means such as wireless transmission. In this embodiment of this disclosure, connection using the bus 1240 is used as an example. The bus 1240 may be a Peripheral Component Interconnect (PCI) bus, an Extended Industry Standard Architecture (EISA) bus, or the like. The bus 1240 may be classified into an address bus, a data bus, a control bus, and the like. For ease of representation, only one bold line is used for representation in FIG. 12, but this does not mean that there is only one bus or only one type of bus.

The processor 1210 may include at least one general-purpose processor, for example, a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The processor 1210 executes various types of digital stored instructions, such as software or firmware programs stored in the memory 1230, to enable the computing device 1200 to provide a wide variety of services.

The memory 1230 is configured to store program code, and the processor 1210 controls execution, to perform processing steps of the cloud platform 131 in any one of the embodiments in FIG. 2 to FIG. 10. The program code may include one or more software modules. The one or more software modules may be the software modules provided in the embodiment shown in FIG. 11, for example, the cloud phone configuration interface providing unit and the network shared file configuration interface providing unit 1150. The cloud phone configuration interface providing unit is configured to provide a cloud phone configuration interface. The cloud phone configuration interface is configured to configure a template cloud phone based on a first input of a user, a plurality of applications are set in the template cloud phone, and a directory of the template cloud phone records installation information of the plurality of applications. The network shared file configuration interface providing unit is configured to provide a network shared file configuration interface. The network shared file configuration interface is configured to store the directory of the template cloud phone into a first network shared file based on a second input of the user. The one or more software modules may be configured to perform step S310 to step S340, step S410 to step S440, and optional steps of the foregoing method, and may be further configured to perform another step that is performed by the cloud platform 131 and that is described in the embodiments in FIG. 3 to FIG. 10. Details are not described herein again.

It should be noted that, this embodiment may be implemented by a general physical server, for example, an ARM server or an X86 server, or may be implemented by a virtual machine implemented based on a general physical server with reference to an NFV technology. The virtual machine refers to a simulated complete computer system that has a complete hardware system function and that runs in a completely isolated environment. This is not limited in this disclosure.

The memory 1230 may include a volatile memory, for example, a random-access memory (RAM). Alternatively, the memory 1030 may include a non-volatile memory, for example, a read-only memory (ROM), a flash memory, or a hard disk drive (HDD), or a solid-state drive (SSD). Alternatively, the memory 1230 may include a combination of the foregoing types. The memory 1230 may store program code, which may include program code used to perform other steps described in the embodiments of FIG. 3 to FIG. 10. Details are not described herein again.

The communication interface 1220 may be a wired interface (for example, an Ethernet interface), or may be an internal interface (for example, a Peripheral Component Interconnect Express (PCIe) bus interface) or a wireless interface (for example, a cellular network interface or a wireless local area network interface), configured to communicate with another device or module.

It should be noted that FIG. 12 is merely a possible implementation of this embodiment of this disclosure. During actual application, the computing device may alternatively include more or fewer components. This is not limited herein. For content that is not shown or described in this embodiment of this disclosure, refer to related descriptions in the embodiments in FIG. 3 to FIG. 10. Details are not described herein again.

It should be understood that the computing device shown in FIG. 12 may alternatively be a computer cluster including at least one server. This is not limited in this disclosure.

An embodiment of this disclosure further provides a computer-readable storage medium. The computer-readable storage medium stores instructions. When the instructions are run on a processor, method procedures shown in FIG. 3 to FIG. 10 are implemented.

An embodiment of this disclosure further provides a computer program product. When the computer program product runs on a processor, method procedures shown in FIG. 3 to FIG. 10 are implemented.

All or some of the foregoing embodiments may be implemented by using software, hardware, firmware, or any combination thereof. When software is used to implement embodiments, the foregoing embodiments may be implemented completely or partially in a form of a computer program product. The computer program product includes at least one computer instruction. When the computer program instructions are loaded and executed on a computer, the procedure or functions according to embodiments are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another web site, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating at least one usable medium. The usable medium may be a magnetic medium (for example, a floppy disk, a hard disk, or a magnetic tape), an optical medium (for example, a compact digital video disc (DVD)), or a semiconductor medium. The semiconductor medium may be an SSD.

The foregoing descriptions are merely embodiments, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A cloud-platform-based cloud phone application installation method, wherein the cloud-platform-based cloud phone application installation method is configured to be implemented by a hardware processor, and wherein the cloud-platform-based cloud phone application installation method comprises:

configuring, by a cloud platform, a template cloud phone in a public cloud data center, wherein a plurality of applications is set in the template cloud phone, wherein a directory of the template cloud phone records installation information of the plurality of applications, wherein the template cloud phone is a first container virtualized in a first physical server in the public cloud data center, and wherein the first container has a first mobile phone operating system;

storing, by the cloud platform, the directory of the template cloud phone into a first network shared file in the public cloud data center;

configuring, by the cloud platform, at least one to-be-configured cloud phone in the public cloud data center to mount the first network shared file to complete installation of the plurality of applications, wherein the first network shared file comprises a first installation directory and a second installation directory, wherein the first installation directory comprises static data of the plurality of applications, wherein the second installation directory comprises dynamic data of the plurality of applications, wherein each of the at least one to-be-configured cloud phone is a second container virtualized in the first physical server or a second physical server in the public cloud data center, and wherein the second container has a second mobile phone operating system;

configuring, by the cloud platform, the at least one to-be-configured cloud phone to connect to the first installation directory in the first network shared file in a read-only manner; and configuring, by the cloud platform, a first multi-layer file system in the at least one to-be-configured cloud phone, wherein the first multi-layer file system is configured for the at least one to-be-configured cloud phone to perform a read/write operation on the second installation directory, wherein the first multi-layer file system comprises an upper-layer directory and a lower-layer directory, wherein the upper-layer directory is configured to store modified data generated during running of an application installed in the at least one to-be-configured cloud phone, wherein the lower-layer directory is configured to connect to the second installation directory in a read-only mapping manner, and wherein the first multi-layer file system is configured to overlay the upper-layer directory and the lower-layer directory.

2. The cloud-platform-based cloud phone application installation method of claim 1, wherein before storing the directory of the template cloud phone into the first network shared file, the cloud-platform-based cloud phone application installation method further comprises:

obtaining, by the cloud platform, the directory of the template cloud phone;

storing, by the cloud platform, the directory of the template cloud phone into an object storage device; and synchronizing, by the cloud platform, storage of the directory of the template cloud phone stored in the object storage device.

3. The cloud-platform-based cloud phone application installation method of claim 1, further comprising:

configuring, by the cloud platform, the first network shared file to connect to the first installation directory in the first network shared file in a read-only manner; and configuring, by the cloud platform, a second multi-layer file system in the first network shared file, wherein the second multi-layer file system is configured to receive and process a data read/write request from the at least one to-be-configured cloud phone, wherein the second multi-layer file system comprises an upper-layer directory and a lower-layer directory, wherein the upper-layer directory is configured to store modified data generated during running of an application installed in the first network shared file, wherein the lower-layer directory is configured to connect to the second installation directory in a read-only mapping manner, and wherein the second multi-layer file system is configured to overlay the upper-layer directory and the lower-layer directory.

4. The cloud-platform-based cloud phone application installation method of claim 3, wherein the template cloud phone, the at least one to-be-configured cloud phone, and the first network shared file are located in a first data center, wherein the cloud-platform-based cloud phone application installation method further comprises creating, by the cloud platform, a second network shared file located in a second data center when a first to-be-configured cloud phone in the at least one to-be-configured cloud phone migrates from the first data center to the second data center, and wherein the second network shared file is a mirror of the first network shared file.

5. The cloud-platform-based cloud phone application installation method of claim 4, further comprising configuring, by the cloud platform, the first to-be-configured cloud phone migrating to the second data center to mount the second network shared file to complete installation of the plurality of applications.

6. The cloud-platform-based cloud phone application installation method of claim 1, wherein before storing the directory of the template cloud phone, the cloud-platform-based cloud phone application installation method further comprises creating, by the cloud platform, the first network shared file.

7. The cloud-platform-based cloud phone application installation method of claim 2, wherein before obtaining the directory of the template cloud phone, the cloud-platform-based cloud phone application installation method further comprises creating, by the cloud platform, the object storage device.

8. The cloud-platform-based cloud phone application installation method of claim 1, wherein the first multi-layer file system comprises an overlay file system.

9. The cloud-platform-based cloud phone application installation method of claim 1, wherein the template cloud phone and the to-be-configured cloud phone comprise a virtual machine, a container, or a bare metal server.

10. A computing device, comprising:

a memory configured to store instructions; and a hardware processor coupled to the memory and configured to execute the instructions to:

configure a template cloud phone in a public cloud data center, wherein a plurality of applications is set in the template cloud phone, wherein a directory of the template cloud phone records installation information of the plurality of applications, wherein the template cloud phone is a first container virtualized in a first physical server in the public cloud data center, and wherein the first container has a first mobile phone operating system;

store the directory of the template cloud phone into a first network shared file in the public cloud data center;

configure at least one to-be-configured cloud phone in the public cloud data center to mount the first network shared file to complete installation of the plurality of applications, wherein the first network shared file comprises a first installation directory and a second installation directory, wherein the first installation directory comprises static data of the plurality of applications, wherein the second installation directory comprises dynamic data of the plurality of applications, wherein each of the at least one to-be-configured cloud phone is a second container virtualized in the first physical server or a second physical server in the public cloud data center, and wherein the second container has a second mobile phone operating system;

configure the at least one to-be-configured cloud phone to connect to the first installation directory in the first network shared file in a read-only manner; and configure a first multi-layer file system in the at least one to-be-configured cloud phone, wherein the first multi-layer file system is configured for the at least one to-be-configured cloud phone to perform a read/write operation on the second installation directory, wherein the first multi-layer file system comprises an upper-layer directory and a lower-layer directory, wherein the upper-layer directory is configured to store modified data generated during running of an application installed in the at least one to-be-configured cloud phone, wherein the lower-layer directory is configured to connect to the second installation directory in a read-only mapping manner, and wherein the first multi-layer file system is configured to overlay the upper-layer directory and the lower-layer directory.

11. The computing device of claim 10, wherein before storing the directory of the template cloud phone into the first network shared file, the hardware processor is further configured to execute the instructions to:

obtain the directory of the template cloud phone;

store the directory of the template cloud phone into an object storage device; and synchronize storage of the directory of the template cloud phone stored in the object storage device to the first network shared file.

12. The computing device of claim 10, wherein the hardware processor is further configured to execute the instructions to:

configure the first network shared file to connect to the first installation directory in the first network shared file in a read-only manner; and configure a second multi-layer file system in the first network shared file, wherein the second multi-layer file system is configured to receive and process a data read/write request from the at least one to-be-configured cloud phone, wherein the second multi-layer file system comprises an upper-layer directory and a lower-layer directory, wherein the upper-layer directory is configured to store modified data generated during running of an application installed in the first network shared file, wherein the lower-layer directory is configured to connect to the second installation directory in a read-only mapping manner, and wherein the second multi-layer file system is configured to overlay the upper-layer directory and the lower-layer directory.

13. The computing device of claim 12, wherein the template cloud phone, the at least one to-be-configured cloud phone, and the first network shared file are located in a first data center, wherein the hardware processor is further configured to execute the instructions to create a second network shared file located in a second data center when a first to-be-configured cloud phone in the at least one to-be-configured cloud phone migrates from the first data center to the second data center, and wherein the second network shared file is a mirror of the first network shared file.

14. The computing device of claim 13, wherein the hardware processor is further configured to execute the instructions to configure the first to-be-configured cloud phone migrating to the second data center to mount the second network shared file to complete installation of the plurality of applications.

15. The computing device of claim 10, wherein before storing the directory of the template cloud phone, the hardware processor is further configured to execute the instructions to create the first network shared file.

16. The computing device of claim 11, wherein before obtaining the directory of the template cloud phone, the hardware processor is further configured to execute the instructions to create the object storage device.

17. The computing device of claim 10, wherein the first multi-layer file system comprises an overlay file system.

18. The computing device of claim 10, wherein the template cloud phone and the to-be-configured cloud phone comprise a virtual machine, a container, or a bare metal server.

19. A computer program product comprising instructions stored on a non-transitory computer-readable storage medium and, when executed by a hardware processor, cause a cloud platform to:

configure a template cloud phone in a public cloud data center, wherein a plurality of applications is set in the template cloud phone, wherein a directory of the template cloud phone records installation information of the plurality of applications, wherein the template cloud phone is a first container virtualized in a first physical server in the public cloud data center, and wherein the first container has a first mobile phone operating system;

store the directory of the template cloud phone into a first network shared file in the public cloud data center;

configure at least one to-be-configured cloud phone in the public cloud data center to mount the first network shared file to complete installation of the plurality of applications, wherein the first network shared file comprises a first installation directory and a second installation directory, wherein the first installation directory comprises static data of the plurality of applications, wherein the second installation directory comprises dynamic data of the plurality of applications, wherein each of the at least one to-be-configured cloud phone is a second container virtualized in the first physical server or a second physical server in the public cloud data center, and wherein the second container has a second mobile phone operating system;

configure the at least one to-be-configured cloud phone to connect to the first installation directory in the first network shared file in a read-only manner; and configure a first multi-layer file system in the at least one to-be-configured cloud phone, wherein the first multi-layer file system is configured for the at least one to-be-configured cloud phone to perform a read/write operation on the second installation directory, wherein the first multi-layer file system comprises an upper-layer directory and a lower-layer directory, wherein the upper-layer directory is configured to store modified data generated during running of an application installed in the at least one to-be-configured cloud phone, wherein the lower-layer directory is configured to connect to the second installation directory in a read-only mapping manner, and wherein the first multi-layer file system is configured to overlay the upper-layer directory and the lower-layer directory.

20. The computer program product of claim 19, wherein before storing the directory of the template cloud phone into the first network shared file, the hardware processor is further configured to execute the instructions to cause the cloud platform to:

obtain the directory of the template cloud phone;

store the directory of the template cloud phone into an object storage device; and synchronize storage of the directory of the template cloud phone stored in the object storage device.

* * * * *